US012691636B2

(12) United States Patent
Arzhangnia et al.

(10) Patent No.: US 12,691,636 B2
(45) Date of Patent: Jul. 28, 2026

(54) APPARATUS FOR VOLUMETRIC 3D-PRINTING FOR FORMING A THREE-DIMENSIONAL OBJECT

(71) Applicant: xolo GmbH, Berlin (DE)

(72) Inventors: Yousef Arzhangnia, Berlin (DE); Martin Herder, Berlin (DE); Marcus Reuter, Berlin (DE)

(73) Assignee: xolo GmbH, Berlin (DE)

( * ) Notice: Subject to any disclaimer, the term of this patent is extended or adjusted under 35 U.S.C. 154(b) by 0 days.

(21) Appl. No.: 19/104,342

(22) PCT Filed: Jun. 13, 2024

(86) PCT No.: PCT/EP2024/066464
§ 371 (c)(1),
(2) Date: Feb. 17, 2025

(87) PCT Pub. No.: WO2024/256591
PCT Pub. Date: Dec. 19, 2024

(65) Prior Publication Data
US 2025/0256457 A1      Aug. 14, 2025

(30) Foreign Application Priority Data
Jun. 16, 2023    (DE) ..................... 10 2023 115 813.9

(51) Int. Cl.
*B29C 64/268* (2017.01)
*B29C 64/124* (2017.01)
(Continued)

(52) U.S. Cl.
CPC .......... *B29C 64/268* (2017.08); *B29C 64/124* (2017.08); *B33Y 10/00* (2014.12); *B33Y 30/00* (2014.12)

(58) Field of Classification Search
CPC ... B29C 64/124; B29C 64/129; B29C 64/135; B29C 64/264; B29C 64/268;
(Continued)

(56) References Cited

U.S. PATENT DOCUMENTS

| | | | |
|---|---|---|---|
| 2022/0212407 A1* | 7/2022 | Matheu | ................ B29C 64/277 |
| 2023/0026951 A1* | 1/2023 | Jarboe | .................... B33Y 30/00 |

(Continued)

FOREIGN PATENT DOCUMENTS

| | | |
|---|---|---|
| WO | 2020245456 | 12/2020 |
| WO | 2022147625 | 7/2022 |

(Continued)

OTHER PUBLICATIONS

International Search Report and Written Opinion dated Aug. 22, 2024 in PCT Application No. PCT/EP2024/066464.

*Primary Examiner* — JaMel M Nelson
(74) *Attorney, Agent, or Firm* — SNELL & WILMER L.L.P.

(57) ABSTRACT

An apparatus for volumetric 3d-printing for forming a three-dimensional object, the apparatus comprising:
  a working volume configured to receive a photopolymerizable material, particularly a photopolymerizable polymer resin, which is to be irradiated with light for forming a three-dimensional object;
  at least one first irradiation device configured to radiate light of a first wavelength into the working volume to generate at least one first light projection in the working volume, the at least one first light projection comprising multiple light beams traversing the working volume in at least one light plane;
  at least one light modulation device assigned to the at least one first irradiation device.

21 Claims, 17 Drawing Sheets

(51) Int. Cl.
    *B33Y 10/00*         (2015.01)
    *B33Y 30/00*         (2015.01)

(58) Field of Classification Search
    CPC ... B29C 64/273; B29C 64/277; B29C 64/282;
               B29C 64/286; B33Y 10/00; B33Y 30/00
    See application file for complete search history.

(56)                      References Cited

U.S. PATENT DOCUMENTS

2023/0094821 A1 *  3/2023  Twietmeyer ........... B33Y 30/00
                                         264/401
2023/0347580 A1 * 11/2023  Martínez Fraiz ..... B29C 64/282
2024/0367385 A1 * 11/2024  Delrot ................... B33Y 30/00

FOREIGN PATENT DOCUMENTS

WO       2022171704       8/2022
WO       2023194559     10/2023
WO    WO-2023225298 A1 * 11/2023  ............. B29C 64/35

* cited by examiner

APPARATUS FOR VOLUMETRIC 3D-PRINTING FOR FORMING A THREE-DIMENSIONAL OBJECT

FIELD OF INVENTION

The invention relates to an apparatus for volumetric 3d-printing for forming a three-dimensional object, the apparatus comprises a working volume configured to receive a photopolymerizable material, particularly a photopolymerizable polymer resin, which is to be irradiated with light for forming a three-dimensional object, and at least one first irradiation device configured to irradiate light of a first wavelength into the working volume to generate at least one first light projection in the working volume, the at least one first light projection comprising multiple light beams traversing the working volume in at least one light plane.

BACKGROUND ART

Apparatuses and related methods for volumetric 3d-printing for forming a three-dimensional object are generally known. Respective apparatuses can be configured to perform at least one local polymerization process of a polymerizable material for continuously additively manufacturing of at least one three-dimensional object by means of multiphoton photopolymerization, particularly multi-color photopolymerization, more particularly dual-color photopolymerization, for instance.

An exemplary principle of a so-called volumetric 3D-printing apparatus and a related method is specified e.g., in WO 2020/245456 A1, the contents of which can be incorporated herein by reference.

It is known that three-dimensional objects manufactured with respective volumetric 3d-printing apparatuses and related methods can have undesired artefacts and thus, undesired properties. Respective artefacts can comprise artefacts on the surface and/or inside the volume of a respective three-dimensional object. Respective artefacts can comprise (quasi) regular or irregular striping or striation artefacts resulting in an optical appearance of the manufactured three-dimensional object as if it was built in layers like in conventional additive manufacturing, such as in well-known stereolithography principles and digital light processing, principles, for instance. Respective artefacts can thus, particularly compromise the optical appearance and related properties of the manufactured three-dimensional object. It is assumed that respective artefacts can result from at least one of: local variations of the light intensity in the working volume in the light plane, laser speckle effects in the light beam or light plane, positive and/or negative optical interferences of the light in the light beam or light plane, shadow formations in the light beam or light plane caused by air bubbles, particles, etc. in the working volume.

As such, there is a need to improve respective 3d-printing apparatuses and related methods with respect to the properties of the three-dimensional objects manufactured therewith.

It is therefore, the object of the invention to overcome the drawbacks of known apparatuses and provide an apparatus for volumetric 3d-printing for forming a three-dimensional object which enables manufacturing a three-dimensional object with improved properties.

SUMMARY OF THE INVENTION

A first aspect of the invention relates to an apparatus for volumetric printing for forming at least one three-dimensional objects. A respective three-dimensional object can be a technical component or a technical component assembly, for instance. The apparatus is thus, generally configured to perform a volumetric 3d-printing process for forming one or more three-dimensional objects. A respective volumetric 3d-printing process can comprise at least one local polymerization process of a polymerizable material, particularly a photopolymerizable material, for the continuous additive manufacture of at least one three-dimensional object, particularly multiple three-dimensional objects, by means of multiphoton photopolymerization, particularly multi-color photopolymerization, more particularly dual-color photopolymerization. The apparatus can thus be configured to perform one or more local polymerization processes of a polymerizable material, e.g., a photopolymerizable monomer resin, which polymerizable material may include but is not limited to acrylates, methacrylates, thiol+ene, epoxides, oxiranes, oxetanes, or vinylethers, and/or a photopolymerizable oligomer resin, which may include but are not limited to acrylates, methacrylates, thiol+ene, epoxides, oxiranes, oxetanes, or vinylethers, for the continuous additive manufacture of at least one three-dimensional object by means of multiphoton photopolymerization, particularly multi-color photopolymerization, more particularly dual-color photopolymerization. As such, the apparatus can be configured to continuously additively manufacture at least one three-dimensional object by means of multiphoton photopolymerization, particularly multi-color photopolymerization, more particularly dual-color photopolymerization, of a photopolymerizable material, particularly a photopolymerizable polymer, e.g., a photopolymerizable polymer resin.

Respective local polymerization processes which can be carried out with the apparatus, typically comprise irradiating a photoinitiator with light of at least one wavelength to convert the molecules of the photoinitiator via sequential optical excitation into a reactive state in which the molecules of the photoinitiator locally trigger a polymerization reaction of a polymerizable material in a working volume of the apparatus. Photopolymerization of the polymerizable material is thus typically effected inside a working volume of the apparatus e.g., by irradiating light of at least one first wavelength and light of at least one further wavelength, which further wavelength is different from the first wavelength, via at least one irradiation device of the apparatus into the working volume of the apparatus, which results in that the molecules of the photoinitiator are converted, e.g., due to the absorption of light of the first wavelength, from an initial state in which the molecules of the photoinitiator (substantially) do not absorb the light of the second or further wavelength, into an intermediate state with changed optical properties compared to the initial state, such that the molecules of the photoinitiator in the intermediate state absorb the light of the further wavelength which results in that the molecules of the photoinitiator are transferred from the intermediate state to the reactive state which locally triggers the polymerization of the photopolymerizable material to manufacture at least one three-dimensional object inside the working volume of the apparatus. A back reaction from the intermediate state into the initial state can be thermally induced, for instance.

The apparatus can thus generally be embodied as a xolography apparatus, i. e. an apparatus configured to perform the base principles of xolography. The base principles of xolography are specified in WO 2020/245456 A1, the contents of which are incorporated herein by reference.

As indicated above, the apparatus comprises a working volume configured to receive a photopolymerizable material, particularly a photopolymerizable polymer resin, which is to be irradiated with light of at least one wavelength, particularly with light of at least two different wavelengths, for forming a three-dimensional object. The working volume of the apparatus can be a local sub-volume of a container volume of a container of the apparatus.

The apparatus can thus, comprise a container which comprises a container volume. As mentioned above, the container volume can comprise a local sub-volume which can represent the working volume of the apparatus. The container volume can be delimited by one or more container walls of the container. The one or more container walls can be transparent with respect to light of a first wavelength and/or light of a further wavelength (as specified above). Respective transparent container walls can be provided as walls of glass, or walls of translucent polymers, such as PC (polycarbonate), PMMA (polymethylmethacrylate), or COC (cyclic olefin copolymer), for instance. At least some of the container walls can, at least to some degree, exhibit diffractive and/or refractive effects to incident light of at least the first wavelength, as will be apparent from further below.

As indicated above, the photopolymerizable material can comprise photoinitiator molecules that can be converted, particularly via an intermediate state, into a reactive state by means of radiation with light of at least one wavelength, wherein the photoinitiator molecules initiate local polymerization of the polymerizable material into the reactive state. As a non-limiting example, respective photoinitiator molecules can comprise spiropyran molecules, i. e. molecules of the spiropyran/merocyanine system in which the spiropyran form is the thermodynamically preferred form and undergoes a ring-opening reaction upon irradiation with light of a first wavelength which results in that the spiropyran form is transferred in the metastable merocyanine form which can be transferred, particularly by absorption of light of a further wavelength, into the reactive state.

As further indicated above, the apparatus comprises at least one first irradiation device comprising at least one light source configured to irradiate light of a first wavelength into the working volume to generate at least one first light projection in the working volume. The at least one first light projection can comprise multiple light beams traversing the working volume in at least one light plane. The at least one light plane can also be deemed or denoted "common light plane". The at least one first light projection and the at least one light plane, respectively can also be deemed or denoted a "light sheet". As an example, the at least one first irradiation device can comprise at least one optical element for generating the at least one light plane. The at least one optical element can comprise at least one of: a Powell-lens, a cylindrical lens, a diffractive optical element, etc. Additionally or alternatively, the at least one first irradiation device can comprise a light deflection unit, such as e.g. a galvo-scanner, or a polygon scanner, for generating the at least one light plane. The at least one first irradiation device can thus be built as or comprise a light plane generator or a light sheet generator. The light as emitted or irradiated by the at least one first irradiation device can comprise a wavelength in the range of: 350 nm-500 nm, particularly 375 nm-450 nm, more particularly 385 nm-440 nm, more particularly 395 nm-420 nm, more particularly 400 nm-410 nm, for instance. The light of the first wavelength can comprise a range or spectrum of wavelengths, particularly at least partly covering the respective ranges. As an example, the first wavelength can be ca. 375 nm. Typically, the first wavelength will be chosen at least under consideration of the photochemical properties, particularly the photochromic properties, of molecules of the photoinitiator.

Particularly, the at least one first irradiation device can be configured to generate a plurality of individual light sheets which extend through the working volume at at least one angle or at least two different angles relative to each other. The plurality of individual light sheets typically, overlap in at least one light sheet overlapping zone. The plurality of individual light sheets can form a resulting light sheet within the working volume. Additionally or alternatively, each individual light sheet comprises a main extension direction through the working volume. The main extension direction of a respective individual light sheet can be the extension direction of the respective individual light sheet between two opposing sides of the working volume or a container, delimiting the working volume, respectively. Hence, the at least one first irradiation device can be configured to generate a plurality of individual light sheets, wherein the main extension directions of the respective individual light sheets extend through the working volume at at least one angle or at least two different angles relative to each other. The main extension directions of the individual light sheets typically, intersect in the at least one light sheet overlapping zone.

More particularly, the at least one first irradiation device can be configured to generate at least four individual light sheets, wherein at least a first individual light sheet extends at a first angle through the photocurable resin, a second individual light sheet extends at an angle of 1-179°, particularly at an angle of essentially 90,° relative to the first individual light sheet through the photocurable resin, a third individual light sheet extends at an angle of 1-179°, particularly at an angle of essentially 90°, relative to the second individual light sheet through the photocurable resin, and a fourth individual light sheet extends at an angle of 1-179°, particularly at an angle of essentially 90°, relative to the third individual light sheet through the photocurable resin. The same can apply to respective main extension directions of the respective individual light sheets.

The apparatus can comprise at least one light deflection device assigned to the at least one first irradiation device. Particularly, the at least one light deflection device can be assigned to at least one light source of the at least one first irradiation device. The at least one light deflection device is configured to deflect light of the at least one first wavelength as emitted by at least one light source of the at least one first irradiation device towards and into the working volume. The at least one light deflection device can be configured to deflect light as emitted by at least one light source of the at least one first irradiation device such that the light enters the working volume in at least two specific orientations and/or positions. The apparatus can comprise two respective light deflection devices, e.g. disposed in an opposite arrangement relative to the working volume, which enables that light of the first wavelength enters the working volume from two or more different sides. A respective opposite arrangement of respective light deflection devices can be in a horizontal axis and/or a vertical axis, for instance. As such, the at least one light plane can be built by light entering the working volume from two different sides, particularly opposing sides, such as lateral sides and/or top and bottom sides of a respective container, for instance. Each of the at least one light deflection devices can be assigned to a specific light source of the at least one first irradiation device.

As such, the at least one first irradiation device can comprise at least two light sources, wherein a first light source is configured to emit light of the first wavelength which is deflected by a first light deflection device towards and into the working volume, and a further or second light source is configured to emit light of the first wavelength which is deflected by a further or second light deflection device towards and into the working volume. Particularly, the light emitted by each respective light source can generate a light plane in the working volume. A respective light plane can generally be built by or comprise multiple light beams which can be emitted simultaneously or sequentially. As an example, the light emitted by the first light source can generate a first light plane in the working volume, and the light emitted by a further light source can emit a further light plane in the working volume. Typically, the respective first and further light planes overlap in the working volume to generate a resulting light plane. The shape of the resulting light plane results from the shape of the first and further light planes.

In exemplary embodiments in which the apparatus is or comprises a computed axial lithography, CAL, apparatus, the at least one first light projection can be a part, e.g. a line, of an image projected by the first irradiation device which can be or comprise a digital light projection device in such embodiments. A respective projected image can comprise multiple light sheets, particularly multiple adjacent light sheets, for instance.

As will be apparent from further below, each respective light deflection device can be or comprise one or more light deflection elements, such as reflective elements, for instance. According to a concrete exemplary embodiment, the at least one light deflection device can comprise at least one mirror element or at least one base body, particularly having a cylinder-like or cylindrical base shape, being rotatably supported about a rotation axis, e.g. its central or symmetrical axis, and having a plurality of light deflection elements, such as reflective elements, provided with its outer surface. A drive device, e.g. an electric motor, (electro) magnetic actuator, piezo-actuator, etc., can be couplable or coupled with the at least one rotatable base body to generate a drive force effecting a rotational motion of the at least one base body about the rotation axis.

In exemplary embodiments, the apparatus can additionally comprise at least one further irradiation device configured to continuously project a plurality of images of light of a further wavelength, the further wavelength being different from the first wavelength, into the working volume. Each image of the further wavelength can correspond to a specific portion, particularly a specific cross-section, of the at least one three-dimensional object to be manufactured with the apparatus. The at least one further irradiation device can thus be built as or comprise an image projector. The light as emitted or irradiated by the at least one further irradiation device can comprise a wavelength in the range of: 400 nm-1000 nm, particularly 425-750 nm, more particularly 450-675 nm, more particularly 500-650 nm, for instance. The light of the further wavelength can comprise a range or spectrum of wavelengths, particularly at least partly covering the respective ranges. Typically, the further wavelength will be chosen at least under consideration of the photochemical properties, particularly the photochromic properties, of molecules of the photoinitiator.

In exemplary embodiments in which the apparatus additionally comprises at least one further irradiation device configured to continuously project a plurality of images, the at least one further irradiation device can be configured to irradiate the light of the further wavelength into the working volume to generate a second light projection in the working volume, the second light projection intersecting the first light projection at a specific angle, particularly an angle of 90°. Hence, the at least one light plane generated by the at least one first irradiation device can be oriented at an angle, particularly at an angle of 90°, relative to the direction of projection of the plurality of images generated by the at least one further irradiation device. In such embodiments, the local polymerization process of the photopolymerizable material and, thus the formation of a three-dimensional object can occur in the region in which the projected images generated by the at least one further irradiation device intersect the at least one light plane generated by the at least one first irradiation device (and vice versa). As indicated above, the local polymerization process of the photopolymerizable material and, thus the formation of a three-dimensional object can take place continuously (which is one characteristic of volumetric 3d-printing relative to conventional additive manufacturing principles).

Typically, the projection of the plurality of images generated by the at least one further irradiation device does not only overlay the at least one light plane generated by the at least one first irradiation device but also has its focus plane in the at least one light plane. Notably, dynamic or static optical properties of the photopolymerizable material, such as the refractive index, can be considered for adjusting the focus plane of the projection of the plurality of images generated by the at least one further irradiation device.

In further exemplary embodiments, the apparatus can comprise at least one beam splitting unit assigned to at least one light source of the apparatus which is configured to generate at least one light beam. The at least one beam splitting unit can be configured to split the at least one light beam generated by the at least one light source into multiple split light beams, wherein one or more split light beams can be used for projecting the at least one light plane into the working volume. Alternatively or additionally, one or more split light beams can be used for projecting respective images into the working volume, wherein each image can correspond to a specific portion, particularly a specific cross-section, of the at least one three-dimensional object to be manufactured by the apparatus.

As such, the apparatus can be operated with a single light source and respective light beams for projecting the at least one light plane can be generated from at least one light beam split off from an original light beam as emitted by the at least one light source via the at least one beam splitting unit, and respective light beams for projecting images can be generated from at least one respective light beam split off from the original light beam as emitted by the at least one light source via the at least one beam splitting unit. The at least one beam splitting unit can be built as or comprise a beam splitting prism, for instance, which is arranged in the optical path downstream of the at least one light source.

As indicated above, the at least one light plane is built by or comprises at least one first light projection generated by the at least one first irradiation device. The first light projection comprises multiple light beams traversing, travelling or propagating through the working volume. The at least one light plane can be vertically oriented. The at least one light plane can have a lateral spatial extension direction and a vertical spatial extension direction. The lateral spatial extension direction of the at least one light plane can be the spatial extension direction of the at least one light plane in which the multiple light beams traverse, travel or propagate through the working volume. The lateral spatial extension direction of the at least one light plane can thus be the lateral distance between an entry point of the container at which the multiple light beams enter the container and an opposed exit point of the container at which the multiple light beams exit the container. The vertical spatial extension direction of the at least one light plane can be the spatial extension direction of the at least one light plane between an uppermost light beam of the multiple light beams of the at least one light plane and a lowermost light beam of the multiple light beams of the at least one light plane. The lateral spatial extension direction of the at least one light plane can thus be the vertical distance between an uppermost light beam of the multiple light beams and a lowermost light beam of the multiple light beams. The vertical spatial extension direction of the at least one light plane can thus correspond to the height dimension of the at least one light plane. Hence, the spatial extension direction of a respective light beam can be the direction in which the respective light beam travels or propagates through the working volume.

The apparatus further comprises at least one light modulation device assigned to the at least one first irradiation device. Particularly, the at least one light modulation device can be assigned to the at least one light source of the at least one first irradiation device. If the at least one first irradiation device comprises multiple light sources, each respective light source can have at least one light modulation device assigned thereto.

The at least one light modulation device is configured to modulate the spatial extension direction of two or more light beams of the multiple beams of the at least one light plane such that the two or more light beams extend in a non-parallel arrangement relative to each other. The at least one light modulation device can be configured to actively and/or passively modify the spatial extension direction and/or orientation of two or more light beams of the multiple light beams in the at least one light plane such that at least two of the multiple light beams have a non-parallel arrangement relative to each other. The non-parallel arrangement of the at least two light beams in the at least one light plane typically results in that at least two light beams intersect at at least one intersection point within the at least one light plane. Particularly, a plurality of intersection points at which at least two light beams intersect are generated at different positions in the at least one light plane. More particularly, a plurality of intersection points at which at least two light beams intersect are generated at different positions in the at least one formation zone or in at least parts of the at least one formation zone. As such, in contrast to light sheets of conventional volumetric 3d-printing apparatuses which comprise a (substantially) parallel arrangement of (collimated) light beams with no intersecting light beams, the at least one light modulation device of the apparatus described herein enables deliberately changing the spatial extension direction and/or orientation of at least two light beams within the at least one light plane such that the at least two light beams extend in a non-parallel arrangement relative to each other within the at least one light plane which results in that one or more intersection points at which two or more light beams intersect are generated within the at least one light plane.

Typically, the at least one intersection point in which the at least two light beams of the first wavelength intersect, is arranged within at least one formation zone of the working volume. The at least one formation zone comprises a zone of the working volume in which the photocurable resin is cured to form at least a portion of the three-dimensional to be printed. In exemplary embodiments of the apparatus which implements principles of multi-color photopolymerization, particularly dual-color photopolymerization, the at least one formation zone thus, comprises the zone of the working volume in which the light of the first wavelength intersects with the light of the second wavelength. Hence, the at least one light modulation device can be configured to generate light beams of the first wavelength which intersect in one or more intersection points within the at least one formation zone under a specific angle, particularly an angle between 1-179°, more particularly less than 90°, preferably less than 70°, more preferably less than 50°.

The at least one light modulation device can be configured to generate one or more points within the working volume or at least one formation zone, respectively through which light beams of the first wavelength extend based on at least one of the following principles for speckle reduction: angular diversity, polarization diversity, and wavelength diversity. The at least one light modulation device can thus, be configured to generate at least two light beams of the first wavelength which have different polarizations or polarization states in at least one point within the working volume, and/or to generate at least two light beams which have different wavelengths, particularly within a specific wavelength range, in at least one point within the working volume. This can be a separate configuration of the at least one light modulation device, particularly independent from the configuration in which the at least one light modulation device is configured to modulate the spatial extension direction of two or more light beams of the multiple beams in the at least one light plane such that the two or more light beams extend in a non-parallel arrangement relative to each other.

Principles of angular diversity can comprise generating or using light beams of the first wavelength extending at an angle relative to each other such that they intersect in at least one point, e.g. an intersection point. Particularly, principles of angular diversity can be implemented at an angle, particularly orthogonal, to the formation direction in which the three-dimensional object is to be printed, particularly to avoid or reduce a loss of resolution in the formation direction.

Principles of polarization diversity can comprise generating or using at least two light beams of the first wavelength which have different polarizations or polarization states, particularly two orthogonal polarization states, in at least one point within the working volume or the at least one formation zone, respectively. Particularly, at least one light beam can be incoherent, e.g. generated by an optical fiber or generated by combining or overlapping light of at least two different light sources. Respective different polarizations or polarization states can comprise different linear polarizations or different circular polarizations, for instance. In such embodiments, the at least one light modulation device can comprise at least one of: at least one optical fiber, at least one polarization element, such as e.g. a polarization filter, particularly a polarization filter which is rotatable about a rotation axis which can be or comprise the axis of a light beam as emitted by a light source of the first wavelength, and a beam expansion device configured to expand an incident light beam, e.g. to generate a light sheet or line-shaped beam cross-section or beam profile, respectively, and at least one collimating element, such as e.g. a collimating lens, for instance.

Principles of wavelength diversity can comprise generating or using at least two light beams of the first wavelength which have different wavelengths in at least one point within the working volume or at least one formation zone, respectively. Particularly, respective different wavelengths can be generated by a broadband light source in combination with an optical filter, e.g. a bandpass filter at varying angles of incidence. Respective different wavelengths can be wavelengths within a range of 350 nm-500 nm, particularly 375 nm-450 nm, more particularly 385 nm-440 nm, more particularly 395 nm-420 nm, more particularly 400 nm-410 nm, for instance. In such embodiments, the at least one light modulation device can comprise at least one of: at least one optical filter element, such as e.g. a bandpass filter, particularly a bandpass filter which is moveable in at least one degree of freedom of motion, e.g. rotatable or tiltable about a rotational or tilt axis which can be or comprise the axis of a light beam as emitted by a light source of the first wavelength, and a beam expansion device configured to expand an incident light beam, e.g. to generate a light sheet or line-shaped beam cross-section or beam profile, respectively, and at least one collimating element, such as e.g. a collimating lens, for instance.

Specifically, the at least one light modulation device can be configured to affect, particularly to at least partly reduce, the optical coherence of light beams within the at least one light plane by deliberately changing the spatial extension direction and/or orientation of at least two light beams such that at least two light beams extend in a non-parallel arrangement relative to each other which results in that two or more light beams intersect at one or more intersection points within the at least one light plane. Changing the spatial extension direction and/or orientation of at least two light beams such that at least two light beams extend in a non-parallel arrangement relative to each other within the at least one light plane also results in that the at least one light plane comprises light beams having angled spatial extension directions while traversing, travelling or propagating through the working volume. Specifically, at least two light beams can traverse, travel or propagate through the working volume at an angle different from 0° relative to each other. An intersection of at least two light beams at one or more intersection points within the at least one light plane can also comprise that at least two light beams can overlay at the one or more intersection points.

The at least one light modulation device can thus be configured to direct, e.g. by diffusing and/or scattering, two or more light beams within the at least one light plane resulting in that the at least one light plane comprises non-parallel and/or non-coherent light beams, respectively. Directing light beams can comprise modifying the spatial extension direction of one or more light beams, particularly with respect to an original spatial extension direction, with the result that the at least one light plane comprises non-parallel and/or non-coherent light beams, respectively. This is just the opposite working principle of conventional light sheet generators which are configured to generate light sheets comprising non-intersecting collimated light beams, i.e. light beams having a parallel spatial extension direction without intersections. As a consequence, in contrast to conventional light sheets substantially having a rectangular base shape being vertically defined by a parallel arrangement of uppermost and lowermost light beams, the at least one light plane as modified by the at least one light modulation device can have a non-rectangular base shape within the working volume, such as e.g. a trapezoidal shape, being vertically defined by non-parallel light beams.

Particularly, the at least one light modulation device can be configured to generate modified light beams having properties different from a Gaussian beam. As such, the at least one light modulation device can be configured to generate modified light beams having a non-Gaussian beam profile, for instance. As an example, the at least one light modulation device can be configured to generate modified light beams, namely Airy-beams or Bessel-beams, for instance or light beams having a characteristic similar to Airy-beams or Bessel-beams, for instance.

In configurations of the apparatus in which a first light plane is generated from light of a first light source having a first modulation device assigned thereto and a further light plane is generated from light of a further light source having a further light modulation device assigned thereto, each light plane can have a non-rectangular base shape within the working volume. As such, since the respective non-rectangular first and further light planes can overlap in the working volume, a resulting light plane typically, also having a non-rectangular base shape within the working volume can be generated whose shape is defined by the respective shapes of the overlapping first and further light planes. In an exemplary embodiment, both a first and a further light plane can have a trapezoidal shape within the working volume such that the resulting light plane can have, at least in the working volume, a hexagon-like base shape or a hexagonal base shape. Similar considerations apply when the respective first and further light planes have other shapes than trapezoidal shapes within the working volume and/or when further light planes generated by further light sources with assigned light modulation devices are added.

In exemplary embodiments in which the at least one first irradiation device comprises two or more light sources, at least one respective light modulation device can be assigned to each respective light source.

Experimental results have surprisingly shown that the deliberate generation of respective intersection points at which two or more light beams intersect in the at least one light plane can significantly reduce respective undesired artefacts and thus, undesired properties, such as (quasi) regular or irregular striping or striation artefacts, resulting in an optical appearance of the manufactured three-dimensional object as if it was built in layers as in conventional additive manufacturing, such as stereolithography principles and/or digital light processing principles, for instance. The at least one light modulation device thus has a positive effect on the properties of three-dimensional objects manufactured with the apparatus.

Also, the implementation of the at least one light modulation device does not compromise the resolution in the formation direction of the three-dimensional object to be printed.

Hence, an improved apparatus for volumetric 3d-printing for forming at least one three-dimensional object is provided.

The at least one light modulation device can comprise one or more optically transmissive elements and/or one or more optically reflective elements and/or one or more optically diffractive elements, for instance. Hence, the configuration of the at least one light modulation device can be configured to affect the spatial extension direction and/or orientation of light beams of the at least one light plane resulting in that at least two light beams extend in a non-parallel arrangement relative to each other based on one or more transmissive effects and/or one or more reflective effects and/or one or more diffractive effects caused by one or more respective optically transmissive elements and/or one or more respective optically reflective elements and/or one or more respective optically diffractive elements.

Non-limiting examples of respective optically transmissive elements are optical elements, e.g. optical lenses, comprising one or more optically transmissive surfaces. Respective optically transmissive elements can have one or more shapes, such as curved shapes, inclined shapes, etc. Respective optically transmissive surfaces of respective optically transmissive elements can be arranged in one or more spatial planes, such that e.g. angled arrangements of two or more optically transmissive surfaces relative to each other are possible. As an example, a conical arrangement of optically transmissive surfaces is conceivable; as such, an optically transmissive element could be or comprise an axicon, for instance. Further, respective optically transmissive elements can have a conical shape or a rooftop-shape, for instance. In either case, respective optically transmissive surfaces can be built by or comprise one or more optically transmissive coatings, for example.

Non-limiting examples of respective optically reflective elements are optical elements, e.g. optical lenses, mirrors, etc., comprising one or more optically reflective surfaces. Respective optically reflective elements can have one or more shapes, such as curved shapes, inclined shapes, etc. Respective optically reflective surfaces of respective optically reflective elements can be arranged in one or more spatial planes, such that e.g. angled arrangements of two or more optically reflective surfaces relative to each other are possible. As an example, a conical arrangement of optically reflective surfaces is conceivable. Further, respective optically reflective elements can have a conical shape or a rooftop-shape, for instance. In either case, respective optically reflective surfaces can be built by or comprise one or more optically reflective coatings, for example.

Non-limiting examples of respective optically diffractive elements are optical elements, e.g. optical lenses, particularly Fresnel lenses, spatial light modulator, Metalenses, etc., comprising one or more optically diffractive surfaces. Respective optically diffractive elements can have one or more shapes, such as curved shapes, inclined shapes, etc. Respective optically diffractive surfaces of respective optically diffractive elements can be arranged in one or more spatial planes, such that e.g. angled arrangements of two or more optically diffractive surfaces relative to each other are possible. As an example, respective optically diffractive elements can have a conical shape or a rooftop-shape, for instance. In either case, respective optically diffractive surfaces can be built by or comprise one or more optically diffractive coatings, for example.

It is conceivable that at least one optical element of the at least one light modulation device comprises, e.g. a combination of at least two of: one or more respective optically transmissive surfaces, one or more respective optically reflective surfaces, and/or one or more respective optically diffractive surfaces, a combination of at least two of optically transmissive surfaces, optically reflective surfaces, and/or optically diffractive surfaces. Respective optically transmissive surfaces and/or optically reflective surfaces and/or optically diffractive surfaces can be built by or comprise one or more optically transmissive coatings and/or reflective coatings and/or optically diffractive coatings, for example.

Particularly, at least one optically transmissive element and/or at least one optically reflective element and/or at least one optically diffracted element can be directly provided in the optical path of the light beams, particularly downstream of an optional collimator device or downstream of an optional objective device, e.g. comprising a multi-lens assembly, such as e.g. used in a classical microscope, of the at least one first irradiation device (as will be set out in more detail further below), so as to change the orientation of the spatial extension direction of at least one light beam with the result that the at least one light beam can intersect with at least one other light beam in the working volume. As an example, a respective optically reflective element, e.g. a mirror, can have an inclined surface relative to the initial spatial extension direction of the respective light beam. Particularly, an opposing arrangement of two or more respective optically reflective elements each having an inclined surface relative to the initial spatial extension direction of the respective light beam is conceivable, wherein each surface is configured to change, via reflection, the spatial extension direction of at least one incident light beam such that the at least one light beam can intersect with at least one other light beam in the working volume. Analogous considerations apply to respective optically transmissive elements and/or respective optically diffractive elements.

As indicated above, the at least one first irradiation device can comprise at least one light source configured to generate the light of the first wavelength and light beams of the first wavelength, respectively. The at least one light modulation device can be arranged in the optical path extending between the at least one light source of the at least one first irradiation device and the working volume, for instance. The at least one light modulation device can thus, be arranged upstream of the working volume. In other words, the at least one light modulation device can be arranged outside the working volume and outside a respective container of the apparatus which comprises the working volume, respectively. Particularly, the at least one light modulation device can be arranged before an entry point of a respective container at which the multiple light beams enter the container to form the at least one light plane in the working volume. This arrangement of the at least one light modulation device outside the container enables that the at least one light modulation device does not reduce the working volume and the available build volume, respectively. Also, the at least one light modulation device is not in contact with the photopolymerizable material such that any possibly undesired interaction between the photopolymerizable material and the at least one light modulation device or components thereof can be avoided.

In exemplary embodiments, the at least one first irradiation device can comprise a collimator device, such as e.g. a collimator lens, configured to collimate the light emitted from the at least one light source of the at least one first irradiation device before it enters the working volume. The at least one light modulation device can be disposed or built between the at least one light source and the collimator device, for instance. Hence, the at least one light modulation device can be disposed in the optical path of the light beams before they pass through the collimator device (upstream of the collimator device) such that the light which passes through the collimator device can comprise at least two light beams already having a non-parallel arrangement relative to each other. In such a configuration, the collimator device can influence the above-mentioned effect of directing light beams such that the at least one light plane comprises non-parallel and/or non-coherent light beams. Additionally or alternatively, the at least one further light modulation device can be disposed or built between the at least one collimator device and the working volume. Hence, the at least one light modulation device can be disposed in the optical path of the light beams after they passed through the collimator device (downstream of the collimator device). The light which passed through the collimator device does comprise light beams having a parallel arrangement relative to each other. In such a configuration, the collimator device does not necessarily influence the above-mentioned effect of directing light beams such that the at least one light plane comprises non-parallel and/or non-coherent light beams at least when there is no further light modulation device in a respective upstream arrangement.

The at least one collimator device can be moveably supported in at least one degree of freedom of motion, particularly relative to the at least one light source of the at least one first irradiation device or relative to the working volume. Hence, the above-mentioned effect of directing light beams such that the at least one light plane comprises non-parallel and/or non-coherent light beams can also be effected or supported by moving the at least one collimator device in at least one degree of freedom of motion. A respective degree of freedom of motion can comprise a translational motion of the at least one collimator device along at least one translation axis. A respective translation axis can be arranged parallel or non-parallel with respect to an axis defining the lateral spatial extension direction of the at least one light plane, for instance. A non-parallel arrangement of a respective translation axis with respect to an axis defining the lateral spatial extension direction of the at least one light plane can comprise an angled arrangement, particularly a perpendicular arrangement, relative to an axis defining the lateral spatial extension direction of the at least one light plane, for instance. In other words, a respective translational motion can comprise an upward and/or downward motion of the at least one collimator device relative to the at least one light plane, for instance. Additionally or alternatively, a respective degree of freedom of motion can comprise a rotational motion of the at least one collimator device about at least one rotation axis. A respective rotation axis can be arranged parallel or non-parallel with respect to an axis defining the lateral spatial extension direction of the at least one light plane, for instance. A non-parallel arrangement of a respective rotation axis with respect to an axis defining the lateral spatial extension direction of the at least one light plane can comprise an angled arrangement, particularly a perpendicular arrangement relative to an axis defining the lateral spatial extension direction of the at least one light plane, for instance. In other words, a respective rotational motion can comprise a pivot motion or a tilt motion of the at least one collimator device relative to the at least one light plane, for instance.

In further exemplary embodiments, the at least one first irradiation device can comprise an objective device, e.g. comprising a multi-lens assembly, such as e.g. used in a classical microscope. The at least one light modulation device can be disposed or built between the at least one light source and the objective device, for instance. Hence, the at least one light modulation device can be disposed in the optical path of the light beams before they pass through the objective device (upstream of the objective device) such that the light which passes through the objective device can comprise at least two light beams already having a non-parallel arrangement relative to each other. In such a configuration, the objective device can influence the above-mentioned effect of directing light beams such that the at least one light plane comprises non-parallel and/or non-coherent light beams. Additionally or alternatively, the at least one further light modulation device can be disposed or built between the at least one objective device and the working volume. Hence, the at least one light modulation device can be disposed in the optical path of the light beams after they passed through the objective device (downstream of the objective device). The light which passed through the objective device does not necessarily comprise at least two light beams already having a non-parallel arrangement relative to each other. In such a configuration, the objective device does not necessarily influence the above-mentioned effect of directing light beams such that the at least one light plane comprises non-parallel and/or non-coherent light beams at least when there is no further light modulation device in a respective upstream arrangement.

The at least one objective device can be moveably supported in at least one degree of freedom of motion, particularly relative to the at least one light source of the at least one first irradiation device or relative to the working volume. Hence, the above-mentioned effect of directing light beams such that the at least one light plane comprises non-parallel and/or non-coherent light beams can also be effected or supported by moving the at least one objective device in at least one degree of freedom of motion. A respective degree of freedom of motion can comprise a translational motion of the at least one objective device along at least one translation axis. A respective translation axis can be arranged parallel or non-parallel with respect to an axis defining the lateral spatial extension direction of the at least one light plane, for instance. A non-parallel arrangement of a respective translation axis with respect to an axis defining the lateral spatial extension direction of the at least one light plane can comprise an angled arrangement, particularly a perpendicular arrangement, relative to an axis defining the lateral spatial extension direction of the at least one light plane, for instance. In other words, a respective translational motion can comprise an upward and/or downward motion of the at least one objective device relative to the at least one light plane, for instance. Additionally or alternatively, a respective degree of freedom of motion can comprise a rotational motion of the at least one objective device about at least one rotation axis. A respective rotation axis can be arranged parallel or non-parallel with respect to an axis defining the lateral spatial extension direction of the at least one light plane, for instance. A non-parallel arrangement of a respective rotation axis with respect to an axis defining the lateral spatial extension direction of the at least one light plane can comprise an angled arrangement, particularly a perpendicular arrangement relative to an axis defining the lateral spatial extension direction of the at least one light plane, for instance. In other words, a respective rotational motion can comprise a pivot motion or a tilt motion of the at least one objective device relative to the at least one light plane, for instance.

Additionally or alternatively, the at least one light modulation device or at least one component thereof, such as a transmissive element and/or a reflective element and/or a diffractive element, for instance, can be moveably supported in at least one degree of freedom of motion, particularly relative to the at least one light source of the at least one first irradiation device or relative to the working volume. Hence, the above-mentioned effect of directing light beams such that the at least one light plane comprises non-parallel and/or non-coherent light beams can also be effected or supported by moving the at least one light modulation device or at least one component thereof, particularly relative to the light source of the at least one first irradiation device or the container, for instance. A respective degree of freedom of motion can comprise a translational motion of the at least one light modulation device or at least one component thereof along at least one translation axis. A respective translation axis can be arranged parallel or non-parallel with respect to an axis defining the lateral spatial extension direction of the at least one light plane, for instance. A non-parallel arrangement of a respective translation axis with respect to an axis defining the lateral spatial extension direction of the at least one light plane can comprise an angled arrangement, particularly a perpendicular arrangement relative to an axis defining the lateral spatial extension direction of the at least one light plane, for instance. In other words, a respective translational motion can comprise an upward and/or downward motion of the at least one light modulation device or at least one component thereof relative to the at least one light plane, for instance. Additionally or alternatively, a respective degree of freedom of motion can comprise a rotational motion of the at least one light modulation device or at least one component thereof about at least one rotation axis. A respective rotation axis can be arranged parallel or non-parallel with respect to an axis defining the lateral spatial extension direction of the at least one light plane, for instance. A non-parallel arrangement of a respective rotation axis with respect to an axis defining the lateral spatial extension direction of the at least one light plane can comprise an angled arrangement, particularly a perpendicular arrangement relative to an axis defining the lateral spatial extension direction of the at least one light plane, for instance. In other words, a respective rotational motion can comprise a pivot motion or a tilt motion of the at least one light modulation device or at least one component thereof relative to the at least one light plane, for instance.

As an example, one or more optical elements, particularly optical lenses, such as e.g. microlenses or one or more arrays of microlenses, of the at least one light modulation device can be arranged to surround the working volume and a respective container delimiting the working volume, respectively. Particularly, the one or more optical elements (this generally applies to all other components of the at least one light modulation device) can be arranged on a carrier structure which surrounds the working volume and a respective container delimiting the working volume, respectively. The carrier structure can thus, define an accommodation space, e.g. a cylindrical or polygonal accommodation space, for accommodating the working volume and a respective container delimiting the working volume, respectively. The carrier structure can thus, have a hollow-cylindrical or polygonal base shape, for instance. The carrier structure can have an open portion (opening), such as e.g. an open lower portion, which enables insertion and removal of a respective container delimiting the working volume. The provision of a carrier structure be particularly, beneficial in connection with embodiments in which the at least one first irradiation device is configured to generate a plurality of individual light sheets, particularly four individual light sheets, which extend through the working volume at at least two different angles relative to each other since it enables generating a resulting light sheet of desired properties.

The carrier structure can be at least partially transparent with respect to the light of the first and/or second wavelength. Particularly, the carrier structure can be transparent with respect to the light of the first and/or second wavelength at portions through which the light of the first and/or second wavelength enters the working volume surrounded by the carrier structure. As such, the carrier structure can be at least partly made of glass or a transparent polymer material, such as e.g. PC (polycarbonate), PMMA (polymethylmethacrylate), or COC (cyclic olefin copolymer), for instance.

The carrier structure can comprise one or more non-reflective surfaces to avoid undesired optical effects based reflection of the light of at least the first wavelength. Respective non-reflective surfaces can be provided at upper and/or lateral portions of the carrier structure. Respective non-reflective surfaces can be provided by non-reflective materials, for instance. As an example, the carrier structure can comprise a flexible element, such as e.g. a foil, particularly having one or more non-reflective surfaces. A concrete example is a lenticular foil or lenticular sheet, respectively.

The carrier structure can be rotatably supported about a rotation axis, particularly a rotation axis which extends parallel to a central axis of the working volume and/or orthogonal to a respective common light plane or light sheet, respectively. At least one support device can be assigned to the carrier structure to support the carrier structure and maintain its orientation and/or position with respect to the rotation axis and working volume, respectively. The at least one support device can comprise one or more support elements, such as e.g. bearings, etc. which are directly or indirectly coupled with the carrier structure. Particularly, at least three support elements can be provided, which are preferably circumferentially equally arranged around the carrier structure. Further, at least one drive device, such as e.g. a motor, can be assigned to the carrier structure to generate a force or momentum which sets the carrier structure in a rotational motion about the rotation axis. The at least one drive device can comprise one or more drive elements, such as e.g. gears, couplable or coupled with the carrier structure to transfer a respective force or momentum on the carrier structure. The at least one drive device can also form a part of the support device or vice versa. Hence, embodiments in which a drive device transfers a force or momentum on the carrier structure via one or more gears and/or one or more bearings, are conceivable.

The carrier structure and/or the working volume and/or a container delimiting the working volume, respectively can be moveably supported relative to each other. Particularly, the carrier structure can be moveably supported in at least one operating position in which it is positioned relative to the working volume and a container delimiting the working volume, respectively such that it surrounds the working volume and the container delimiting the working volume, respectively, and in at least one non-operating position in which it is positioned relative to the working volume and the container delimiting the working volume, respectively such that it does not surround the working volume and the container delimiting the working volume, respectively. As such, a transfer structure can be assigned to the carrier structure which is configured to transfer the carrier structure in the at least one operating and non-operating position, respectively.

Additionally or alternatively, the at least one first irradiation device or at least one component thereof, particularly a light source of the at least one first irradiation device, can be moveably supported in at least one degree of freedom of motion, particularly relative to the at least one light plane. Hence, the above-mentioned effect of directing light beams such that the at least one light plane comprises non-parallel and/or non-coherent light beams can also be effected or supported by moving the at least one first irradiation device or at least one component thereof, particularly relative to the at least one light plane. A respective degree of freedom of motion can comprise a translational motion of the at least one first irradiation device or at least one component thereof along at least one translation axis. A respective translation axis can be arranged parallel or non-parallel with respect to an axis defining the lateral spatial extension direction of the at least one light plane, for instance. A non-parallel arrangement of a respective translation axis with respect to an axis defining the lateral spatial extension direction of the at least one light plane can comprise an angled arrangement, particularly a perpendicular arrangement relative to an axis defining the lateral spatial extension direction of the at least one light plane, for instance. In other words, a respective translational motion can comprise an upward and/or downward motion of the at least one first irradiation device or at least one component thereof relative to the at least one light plane, for instance. Additionally or alternatively, a respective degree of freedom of motion can comprise a rotational motion of the at least one first irradiation device or at least one component thereof about at least one rotation axis. A respective rotation axis can be arranged parallel or nonparallel with respect to an axis defining the lateral spatial extension direction of the at least one light plane, for instance. A non-parallel arrangement of a respective rotation axis with respect to an axis defining the lateral spatial extension direction of the at least one light plane can comprise an angled arrangement, particularly a perpendicular arrangement relative to an axis defining the lateral spatial extension direction of the at least one light plane, for instance. In other words, a respective rotational motion can comprise pivot motion of the at least one first irradiation device or at least one component thereof relative to the at least one light plane, for instance.

Any motion of at least one of: the at least one collimator device, the at least one light modulation device or at least one component thereof, or the at least one first irradiation device or at least one component thereof can be effected by at least one drive device, such as an electric motor, (electro) magnetic actuator, piezo actuator, etc., for instance, which is configured to generate drive forces to move at least one of: the at least one collimator device, the at least one light modulation device or at least one component thereof, or the at least one first irradiation device or at least one component thereof in at least one respective degree of freedom of motion. The at least one drive device is thus directly or indirectly couplable or coupled with the at least one collimator device, the at least one light modulation device and/or at least one component thereof, or the at least one first irradiation device or at least one component thereof so as to effect motions of the at least one collimator device, the at least one light modulation device or at least one component thereof, or the at least one first irradiation device or at least one component thereof in the at least one degree of freedom of motion. In exemplary embodiments, each of the at least one collimator device, the at least one light modulation device or at least one component thereof, or the at least one first irradiation device or at least one component thereof comprises at least one respective drive device.

Operation of the at least one drive device can be controlled by at least one hardware- and/or software-embodied control unit assigned thereto. The control unit can be, particularly configured to effect regular and/or irregular motions, particularly oscillating motions and/or non-oscillating motions, of the at least one collimator device, the at least one light modulation device or at least one component thereof, and/or the at least one first irradiation device or at least one component thereof in the at least one degree of freedom of motion. The control unit can be particularly, configured to implement motion profiles of the at least one collimator device, the at least one light modulation device or at least one component thereof, or the at least one first irradiation device or at least one component thereof in one more or degrees of freedom of motion. Experimental results have shown that both regular and irregular motions can reduce respective striping or striation effects and positively influence the properties, particularly the surface and/or bulk properties, of the three-dimensional object which is to be manufactured with the apparatus. In exemplary embodiments, in which each of the at least one collimator device, the at least one light modulation device or at least one component thereof, and/or the at least one first irradiation device or at least one component thereof comprises at least one respective drive device, operation of the respective drive devices can be controlled dependent or independent from each other. Particularly, respective motion profiles can be implemented by a dependent or independent control of the operation of respective drive devices assigned to the at least one collimator device, the at least one light modulation device or at least one component thereof, and/or the at least one first irradiation device or at least one component thereof.

Further exemplary and thus, non-limiting configurations of the at least one light modulation device are specified in the following:

As indicated above, the at least one light modulation device can comprise one or more optical elements. Respective optical elements can form respective components of the at least one light modulation device. Each optical element can be configured to change the original spatial extension direction and/or orientation of an incident light beam so as to generate a light beam having a different spatial extension direction and/or orientation relative to the original spatial direction and/or orientation. Hence, each optical element can be configured to generate at least one light beam with a modified spatial extension direction and/or orientation relative to an original spatial extension direction and/or orientation. Particularly, at least one optical element can be configured to generate multiple light beams each with a modified spatial extension direction and/or orientation relative to a respective original spatial extension direction and/or orientation. As such, a respective optical element can generate at least one light plane comprising two or more light beams having the desired non-parallel arrangement relative to each other.

In exemplary embodiments, respective optical elements can be built as or comprise optical lenses, particularly microlenses, more particularly cylindrical microlenses, and/or optical diffuser elements, particularly elliptical diffuser elements. Hence, the at least one light modulation device can comprise an arrangement of multiple optical lenses, particularly microlenses, more particularly cylindrical microlenses; a respective light modulation device can particularly, be deemed or denoted a microlens device. Additionally or alternatively, the at least one light modulation device can comprise an arrangement of optical diffuser elements; a respective light modulation device can particularly, be deemed or denoted a diffuser device.

Respective optical elements can be arranged in at least one row and/or column. The at least one light modulation device can thus, comprise an arrangement of respective optical elements in at least one row and/or at least one column. Respective optical elements can thus, be arranged in a one- or multi-dimensional array comprising at least one row comprising at least one optical element and/or at least one column comprising at least one optical element. As indicated above, a respective optical element can be or comprise an optical lens, particularly a microlens, more particularly a cylindrical microlens, and/or an optical diffuser element, particularly an elliptical diffuser element.

The one or more optical elements can be arranged or built on at least one side of at least one substrate element. The at least one light modulation device can thus, comprise at least one substrate element having one or more respective optical elements arranged or built on at least one side thereof. Particularly, a respective substrate element can comprise a first side and a second side opposing the first side. One or more optical elements can thus be arranged or built on the first and/or second side of the substrate element. By changing e.g. the arrangement, number, shape, and type of optical elements arranged on the respective first and/or second side of the substrate element, the capability to modify the spatial extension direction of incident light beams can be adjusted.

As indicated above, the at least one light modulation device can be arranged in the optical path of the light beams upstream of the working volume. The same applies to the at least one substrate element and the respective one or more optical elements arranged or built on at least one side thereof. More particularly, the at least one substrate element and respective one or more optical elements arranged or built on at least one side thereof can be disposed upstream or downstream of a respective collimator device which is arranged in the optical path extending between the at least one light source of the at least one first irradiation device and the container of the apparatus. By choosing an arrangement of the at least one substrate element and respective one or more optical elements arranged or built on at least one side thereof up-or downstream of a respective collimator device, the overall directing effect resulting in that the at least one light plane comprises non-parallel and/or non-coherent light beams which can be generated with the at least one light modulation device can be adjusted.

In further exemplary embodiments in which the apparatus comprises a collimator device configured to collimate the light emitted from the at least one light source of the at least one first irradiation device before the light enters the working volume, the at least one light modulation device can be built by or comprise at least one optical lens, particularly a plano-concave lens or a freeform lens, arranged upstream or downstream of the collimator device. Hence, the at least one light modulation device can be built by or comprise at least one optical lens provided upstream or downstream of the collimator device. An arrangement of the at least one optical lens upstream of the collimator device means that the at least one optical lens is arranged in a portion of the optical path extending between the at least one light source of the at least one first irradiation device and the collimator device. Likewise, an arrangement downstream of the collimator device means that the at least one optical lens is arranged in a portion of the optical path extending between the collimator device and the working volume.

As indicated above, the apparatus can comprise at least one light deflection device configured to deflect light emitted from the at least one light source of the at least one first irradiation device towards the working volume, particularly towards a collimator device arranged upstream of the working volume (if present). In such exemplary embodiments, the at least one light modulation device can comprise at least one optical lens, particularly a plano-convex lens or freeform lens, arranged upstream of the at least one light deflection device. An arrangement of the at least one optical lens upstream of the at least one light deflection device means that the at least one optical lens is arranged in a portion of the optical path extending between the at least one light source of the at least one first irradiation device and the at least one light deflection device. Such an arrangement can be particularly, useful for generating light having a line profile. Generating light having a line profile can be particularly, useful in combination with a further optical lens disposed in between the at least one light deflection device and a collimator device arranged upstream of the working volume. As indicated above, the at least one light deflection device can be built by or comprise at least one base body, particularly having a cylinder-like or cylindrical base shape, the base body being rotatably supported about its central or symmetrical axis, and having a plurality of light deflection elements, such as reflective elements, provided with its outer surface.

In further exemplary embodiments in which the apparatus comprises at least one light deflection device configured to deflect light emitted from the at least one light source of the at least one first irradiation device towards the working volume, particularly towards a collimator device arranged upstream of the working volume, the at least one light modulation device can comprise at least one beam steering device arranged upstream or downstream of the at least one light deflection device. The at least one beam steering device can be configured to change the spatial extension direction and/or orientation of at least one light beam emitted from the at least one light source of the at least one first irradiation device towards the light deflection device in an arrangement upstream of the at least one light deflection device or towards the working volume in an arrangement downstream of the at least one light deflection device. Hence, the desired non-parallel arrangement of at least two light beams relative to each other within the at least one light plane can also be effected or supported by at least one beam steering device arranged upstream or downstream of the at least one light deflection device. An arrangement of the at least one beam steering device upstream of the at least one light deflection device means that the at least one beam steering device is arranged in a portion of the optical path extending between the at least one light source of the at least one first irradiation device and the at least one light deflection device. An arrangement of the at least one beam steering device downstream of the at least one light deflection device means that the at least one beam steering device is arranged in a portion of the optical path extending between the at least one light deflection device and the working volume.

The at least one beam steering device can comprise at least one optically transmissive element, e.g. a glass plate, moveably supported in at least one degree of freedom of motion. Such a configuration can particularly apply to an arrangement of the at least one beam steering device upstream of the at least one light deflection device. The at least one beam steering device can be configured to change the spatial extension direction and/or orientation of at least one light beam emitted from the at least one light source of the at least one first irradiation device towards the at least one light deflection device via one or more motions of the at least one optically transmissive element in the at least one degree of freedom of motion. A respective degree of freedom of motion can be or comprise a translational motion of the at least one optically transmissive element along a translation axis and/or a rotational motion, e.g. a pivot motion or a tilt motion, of the at least one optically transmissive element about a rotation axis. As indicated above, the at least one light deflection device can be built by or comprise at least one base body, particularly having a cylinder-like or cylindrical base shape, the base body being rotatably supported about its central or symmetrical axis, and having a plurality of light deflection elements, such as reflective elements, provided with its outer surface. Motions of the at least one optically transmissive element of the at least one beam steering device can be synchronized with rotational motions of the base body of the at least one light deflection device by means of at least one hardware- and/or software-embodied control unit configured to control motions of the at least one optically transmissive element and the base body.

In further exemplary embodiments, the at least one beam steering device can comprise at least one optically reflective element, e.g. a mirror, moveably supported in at least one degree of freedom of motion. Such a configuration can particularly apply to an arrangement of the at least one beam steering device upstream or downstream of the at least one light deflection device. In an arrangement upstream of the at least one light deflection device, the at least one beam steering device can be configured to change the spatial extension direction and/or orientation of at least one light beam emitted from the at least one light source of the at least one first irradiation device towards the at least one light deflection device via one or more motions of the at least one optically reflective element in the at least one degree of freedom of motion. In an arrangement downstream of the at least one light deflection device, the at least one beam steering device can be configured to change the spatial extension direction and/or orientation of at least one light beam deflected from the at least one light deflection device towards the working volume via one or more motions of the at least one optically reflective element in the at least one degree of freedom of motion. A respective degree of freedom of motion can be or comprise a translational motion of the at least one optically reflective element along a translation axis and/or a rotational motion, e.g. a pivot motion or a tilt motion, of the at least one optically reflective element about a rotation axis. As indicated above, the at least one light deflection device can be built by or comprise at least one base body, particularly having a cylinder-like or cylindrical base shape, the base body being rotatably supported about its central or symmetrical axis, having a plurality of light deflection elements, such as reflective elements, provided with its outer surface. Motions of the at least one reflective element of the at least one beam steering device can be synchronized with rotational motions of the base body of the at least one light deflection device by means of at least one hardware- and/or software-embodied control unit configured to control motions of the at least one optically transmissive element and the base body.

In further exemplary embodiments, the at least one light modulation device can comprise at least one adaptive optical element having an adaptive shape and thus, a variable shape. An adapted and thus, variable shape means that the at least one adaptive optical element can vary its geometric dimensions, e.g. its length and/or width, and/or height, particularly relative to a reference state, in at least one spatial direction. The at least one adaptive optical element can thus, be configured to change the spatial extension direction and/or orientation of at least one light beam via one or more adaptive changes or variations of its shape. A respective adaptive optical element can be particularly, arranged downstream of a respective light deflection device. A respective adaptive optical element can be particularly, configured to dynamically change the focal length of the light beams incident in the working volume based on respective changes of its shape. A hardware- and/or software-embodied control unit can be assigned to the at least one adaptive optical element which is configured to control changes and/or variations of the shape of the at least one adaptive optical element.

The at least one adaptive optical element can be built as or comprise an adaptive optically transmissive element, particularly an adaptive lens, more particularly a liquid lens, or an adaptive optically reflective element, particularly an adaptive reflective mirror, more particularly liquid mirror, for instance.

The at least one adaptive optical element can be arranged upstream or downstream of the at least one light deflection device.

In exemplary embodiments in which the apparatus comprises at least one light deflection device comprising at least one base body, particularly having a cylinder-like or cylindrical base shape, the base body being rotatably supported about its central or symmetrical axis, and having a plurality of light deflection elements, such as reflective elements, provided with its outer surface, the at least one light modulation device can comprise at least one optical modulation element attached to the outer surface of the base body. Particularly, the at least one optical modulation element can be attached to the outer surface of at least one respective light deflection element, provided with the outer surface of the base body. Respective optical modulation elements can be transmissive elements, such as e.g. glass elements, which can effect the desired non-parallel arrangement of at least two light beams within the at least one light plane.

Additionally or alternatively, in exemplary embodiments in which the apparatus comprises at least one light deflection device comprising at least one base body, particularly having a cylinder-like or cylindrical base shape, the base body being rotatably supported about its central or symmetrical axis, the at least one light modulation device can comprise a one- or multi-dimensional surface structuring of the outer surface of the base body. A respective one- or multi-dimensional surface structuring of the outer surface of the base body can comprise a specific arrangement, e.g. an alternating arrangement, of reflective and/or transmissive and/or diffractive elements. Respective reflective and/or transmissive and/or diffractive elements can have the same shape or different shapes. As an example, a respective one- or multi-dimensional surface structuring of the outer surface of the base body can comprise a specific arrangement, e.g. an alternating arrangement, of reflective and/or transmissive and/or diffractive elements having convex shapes, concave shapes, cylindrical shapes, polygonal shapes, etc. Additionally or alternatively, a respective one- or multi-dimensional surface structuring of the outer surface of the base body can comprise chemical and/or physical modifications of the surface of light deflection elements provided with the outer surface of the base body. Respective chemical and/or physical modifications can be implemented by deposition processes in which at least one optically effective deposition material is deposited on at least one light deflection element so as to modify its optical properties, etching process in which the surface of at least one light deflection element is etched so as to modify its optical properties, etc.

In either embodiment, the or at least one light modulation device can be configured to generate incoherent light. A respective light modulation device can thus, comprise at least one incoherent light source, such as e.g. a light emitting diode, configured to generate incoherent light and/or at least one optical light guide, such as e.g. an optical fiber, configured to alter the properties of coherent light such that incoherent light is obtained. Further, devices configured to decrease the longitudinal coherence lengths of the emitted light, such as so-called speckle killers, are conceivable. Incoherent light can comprise respective intersecting light beams and thus, effect the desired intersection of light beams in the working volume.

As indicated above, the working volume can be provided by at least one container of the apparatus. The container delimits a container volume for receiving a photopolymerizable material. It is also conceivable that the container is moveably supported in at least one degree of freedom of motion, e.g. relative to at least one light source of the at least one first irradiation device, to effect or support the desired non-parallel arrangement of at least two light beams within the at least one light plane, e.g. due to diffractive effects of the material forming the container walls. As indicated above, at least some of the container walls can enable diffractive effects to at least some degree such that motions of the container in at least one degree of freedom of motion can effect or support the desired non-parallel arrangement of at least two light beams within the at least one light plane.

In either embodiment, the apparatus can comprise a determination device configured to determine the surface and/or bulk properties of a three-dimensional object being manufactured with the apparatus. The determination device can comprise a detection unit, e.g. an optical detection unit, such as a camera, for instance, configured to detect at least one information indicative of the surface and/or bulk properties of a three-dimensional object being manufactured with the apparatus. The at least one information indicative of the surface and/or bulk properties of a three-dimensional object being manufactured with the apparatus can be communicated to a hardware- and/or software-embodied control unit configured to control operation of the at least one light modulation device based on the at least one information. In such a manner, a process control loop can be implemented. This particularly, applies when respective information indicative of the surface and/or bulk properties of a three-dimensional object being manufactured with the apparatus is used for an online control of the operation of the at least one light modulation device.

A second aspect of the invention relates to a method for volumetric 3d-printing to form a three-dimensional object. The method comprises at least the following steps: generating, via at least one first irradiation device configured to irradiate light of a first wavelength into a working volume comprising a photopolymerizable material, particularly a photopolymerizable polymer resin, a first light projection in the working volume, the first light projection comprising multiple light beams traversing the working volume in at least one light plane; and modulating, via at least one light modulation device assigned to the at least one first irradiation device, the spatial extension direction of two or more light beams of the multiple beams in the at least one light plane such that the two or more light beams extend in a non-parallel arrangement relative to each other.

Preferably, the method is performed with light of at least two different wavelengths, wherein a first wavelength is used for generating or projecting a respective light plane, and a further wavelength is used for generating or projecting respective images of cross-sections of the three-dimensional object to be built. As is clear from above, the first wavelength is typically smaller than the further wavelength. The method thus preferably implements principles of so-called dual-color photopolymerization.

The method can be implemented with an apparatus according to the first aspect of the invention. Hence, all annotations regarding the apparatus according to the first aspect of the invention also relate to the method according to the second aspect of the invention and vice versa.

BRIEF DESCRIPTION OF THE DRAWINGS

With these and other advantages and features that will become hereinafter apparent, a more complete understanding of the invention can be obtained by referring to the following description of the appended drawings in which.

DETAILED DESCRIPTION OF THE DRAWINGS

Figure 1:
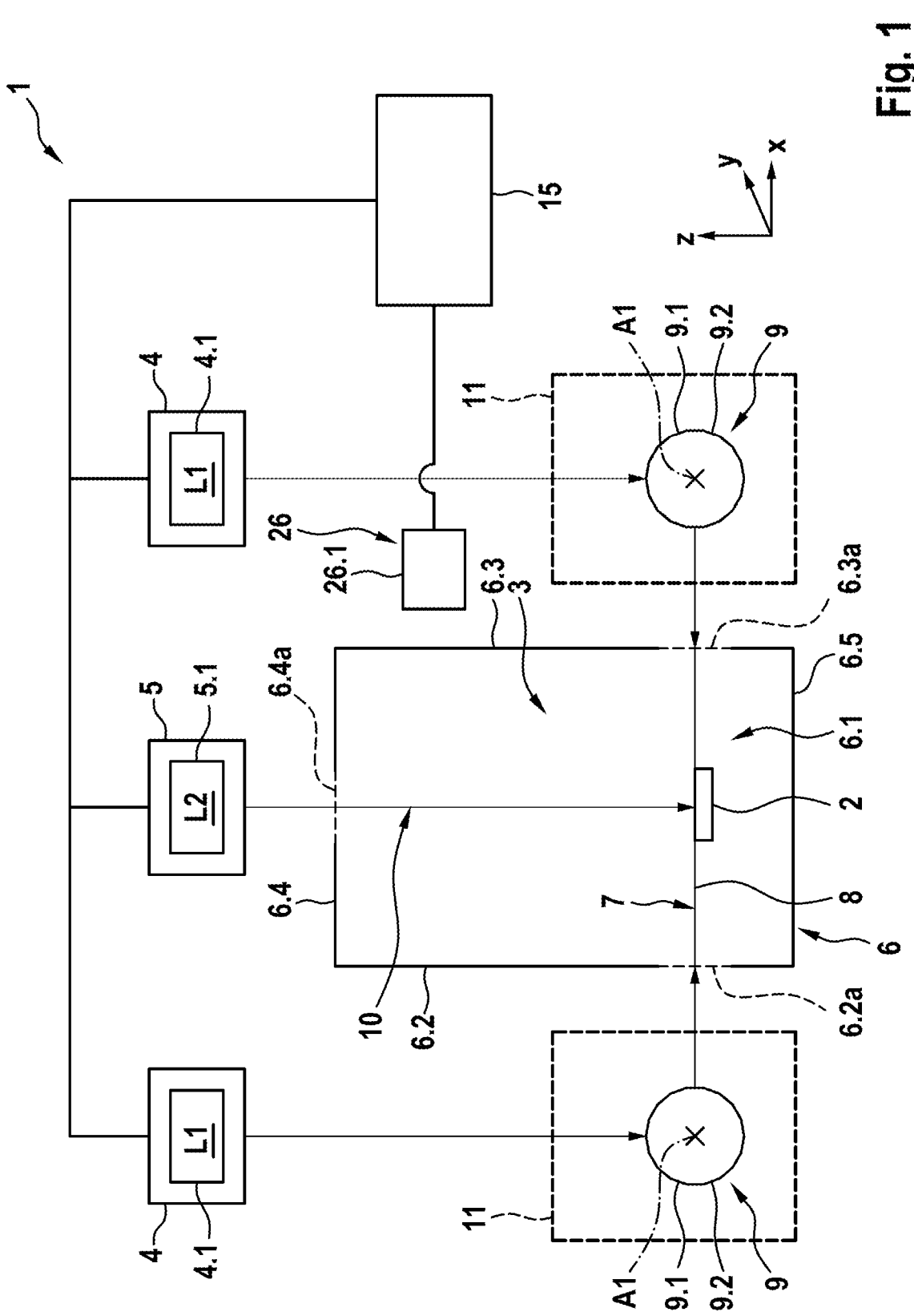
FIG. 1-14 each show a principle drawing of an apparatus for volumetric 3d-printing for forming at least one three-dimensional object according to an exemplary embodiment.

FIG. 1 shows a principle drawing of an apparatus 1 for volumetric 3d-printing for forming at least one three-dimensional object 2 according to an exemplary embodiment in a top-view. An exemplary coordinate system of the apparatus 1 showing coordinate axes x, y, and z is added for reference purposes with respect to the principle drawings according to FIG. 2-14 and FIG. 16-18.

The apparatus 1 is generally configured to perform a volumetric 3d-printing process for forming one or more three-dimensional objects. A respective volumetric 3d-printing process can comprise at least one local polymerization process of a photopolymerizable material for the continuous additive manufacture of one or more three-dimensional objects by means of multiphoton photopolymerization, particularly multi-color photopolymerization, more particularly dual-color photopolymerization. The apparatus 1 can thus be configured to perform one or more local polymerization processes of a photopolymerizable material, e.g. a photopolymerizable monomer resin, which polymerizable material may include but is not limited to acrylates, methacrylates, thiol+ene, epoxides, oxiranes, oxetanes, or vinylethers, and/or a photopolymerizable oligomer resin, which may include but are not limited to acrylates, methacrylates, thiol+ene, epoxides, oxiranes, oxetanes, or vinylethers, for the continuous additive manufacture of one or more three-dimensional objects by means of multiphoton photopolymerization, particularly multi-color photopolymerization, more particularly dual-color photopolymerization. As such, the apparatus 1 can be configured to continuously additively manufacture one or more three-dimensional objects by means of multiphoton photopolymerization, particularly multi-color photopolymerization, more particularly dual-color photopolymerization, of a photopolymerizable material, particularly a photopolymerizable polymer, e.g., a photopolymerizable polymer resin.

Respective local polymerization processes which can be carried out with the apparatus 1 can comprise irradiating a photoinitiator with light L1 of a first wavelength and light L2 of a further wavelength to convert the molecules of the photoinitiator via sequential optical excitation into a reactive state in which the molecules of the photoinitiator locally trigger a polymerization reaction of the polymerizable material in a working volume 3 of the apparatus 1. Photopolymerization of the photopolymerizable material can thus be effected inside the working volume 3 of the apparatus 1 by irradiating light L1 of a first wavelength and light L2 of a further wavelength, which further wavelength is different from the first wavelength, via at least one first irradiation device 4 and at least one further irradiation device 5 of the apparatus 1 into the working volume 3 of the apparatus 1, which results in that the molecules of the photoinitiator are converted, e.g., due to the absorption of light L1 of the first wavelength, from an initial state in which the molecules of the photoinitiator (substantially) do not absorb the light L2 of the further wavelength, into an intermediate state with changed optical properties compared to the initial state, such that the molecules of the photoinitiator in the intermediate state absorb the light L2 of the further wavelength which results in that the molecules of the photoinitiator are transferred from the intermediate state to the reactive state which locally triggers the polymerization of the photopolymerizable material to manufacture one or more three-dimensional objects inside the working volume 3 of the apparatus 1.

Particularly, in the initial state, the molecules of the photoinitiator can have an attenuation coefficient or extinction coefficient, respectively of less than 5000 L mol$^{-1}$ cm$^{-1}$, particularly less than 1000 L mol$^{-1}$ cm$^{-1}$, more particularly less than 500 L mol$^{-1}$ cm$^{-1}$, more particularly less than 250 L mol$^{-1}$ cm$^{-1}$, more particularly less than 100 L mol$^{-1}$ cm$^{-1}$, with respect to the light L1 of the first wavelength. The attenuation coefficient or extinction coefficient, respectively can be calculated according to Beer's law from the absorbance of a sample of know photoinitiator concentration, measured with a UV-Vis spectrophotometer of the type "Cary 60", which can be supplied by Agilent Technologies, for instance.

The back reaction of the molecules of the photoinitiator from the intermediate state to the initial state can be thermally induced, for instance.

The apparatus 1 can generally be embodied as a xolography apparatus, i. e. an apparatus configured to perform the base principles of xolography. The base principles of xolography are specified in WO 2020/245456 A1, the contents of which are incorporated herein by reference.

As indicated above, the apparatus 1 comprises a working volume 3 configured to receive a photopolymerizable material (not explicitly shown in the Fig.), particularly a photopolymerizable polymer resin, which is to be irradiated with light L1, L2 of at least two different wavelengths for forming one or more three-dimensional objects 2.

As is apparent from the Fig., the working volume 3 of the apparatus 1 can be a local sub-volume of a container 6 of the apparatus 1. The apparatus 1 can thus, comprise the container 6 which comprises a container volume 6.1 which comprises the local sub-volume which can represent the working volume 3 of the apparatus 1. The container volume 6.1 can be delimited by one or more container walls 6.2-6.5 of the container 6. The container walls 6.2-6.5 can be transparent with respect to light L1 of the first wavelength and light L2 of the further wavelength. In the exemplary embodiment of FIG. 1, the container walls 6.2-6.4 comprise wall portions 6.2a and 6.3a (windows) which are transparent for the light L1 of the first wavelength and at least one wall portion 6.4a (window) which is transparent for the light L2 of the further wavelength. Respective transparent container walls 6.2-6.5 or container wall portions 6.2a-6.4a, respectively can be provided as walls of glass, or walls of translucent polymers, such as PC (polycarbonate), PMMA (polymethylmethacrylate), or COC (cyclic olefin copolymer), for instance. At least some of the container walls 6.2-6.5 or container wall portions 6.2a-6.4a can, at least to some degree, exhibit diffractive and/or refractive effects to incident light L1 of at least the first wavelength.

In the exemplary embodiment, the apparatus 1 comprises a first irradiation device 4 comprising two light sources 4.1 each configured to generate light L1 of the first wavelength and irradiate the same into the working volume 3 and a further irradiation device 5 comprising a light source 5.1 configured to generate light L2 of the further wavelength and irradiate the same into the working volume 3.

Notably, the first irradiation device 4 is configured to irradiate light L1 of the first wavelength into the working volume 3 to generate a first light projection 7 in the working volume 3, the first light projection 7 comprising multiple light beams 7.1 traversing the working volume 3 in light plane 8. In the exemplary embodiments, the light plane 8 vertically extends in the x-y-plane of the coordinate system and can also be deemed or denoted "common light plane". The first light projection 7 and the light plane 8, respectively can also be deemed or denoted a "light sheet". The first irradiation device 4 is thus built as or comprise a light plane generator or a light sheet generator. The light L1 as emitted or irradiated by the first irradiation device 4 can comprise a wavelength in the range of: 350 nm-500 nm, particularly 375 nm-450 nm, more particularly 385 nm-440 nm, more particularly 395-420 nm, more particularly 400 nm-410 nm, for instance. The light L1 of the first wavelength can comprise a range or spectrum of wavelengths, particularly at least partly covering the respective ranges. Typically, the first wavelength will be chosen at least under consideration of the photochemical properties, particularly the photochromic properties, of molecules of the photoinitiator.

The further irradiation device 5 is configured to irradiate the light L2 of the further wavelength into the working volume 3 to generate a second light projection 10 in the working volume 3. The further irradiation device 5 can thus be built as or comprise an image projector. The light L2 as emitted or irradiated by the further irradiation device 5 can comprise a wavelength in the range of: 400 nm-1000 nm, particularly 425-750 nm, more particularly 450-675 nm, more particularly 500-650 nm, for instance. The light L2 of the further wavelength can comprise a range or spectrum of wavelengths, particularly at least partly covering the respective ranges. Typically, the further wavelength will be chosen at least under consideration of the photochemical properties, particularly the photochromic properties, of molecules of the photoinitiator.

FIG. 1 shows that the second light projection 10 can intersect the first light projection 7 at a specific angle, particularly an angle of 90°. Hence, the light plane 8 generated by the first irradiation device 4 can be oriented at an angle, particularly at an angle of 90°, relative to the direction of projection of the plurality of images generated by the further irradiation device 5. The local polymerization process of the photopolymerizable material and, thus the formation of a three-dimensional object 2 can occur in the region in which the projected images generated by the further irradiation device 5 intersect the light plane 8 generated by the first irradiation device 4 (and vice versa). As indicated above, the local polymerization process of the photopolymerizable material and, thus the formation of a three-dimensional object 2 can take place continuously (which is one characteristic of volumetric 3d-printing relative to conventional additive manufacturing principles). During a 3d-printing process with the apparatus 1, either the light plane 8 or the container 6 can be moved to form a three-dimensional object 2.

Typically, the projection of the plurality of images generated by the further irradiation device 5 does not only overlay the light plane 8 generated by the first irradiation device 4 but also has its focus plane in the light plane 8. Notably, dynamic or static optical properties of the photopolymerizable material, such as the refractive index, can be considered for adjusting the focus plane of the projection of the plurality of images generated by the further irradiation device 5.

FIG. 1 shows that the apparatus 1 can comprise two light deflection devices 9 assigned to the respective first irradiation devices 4. The light deflection devices 9 are configured to deflect light L1 of the first wavelength as emitted by respective light sources 4.1 of the respective first irradiation devices 4 towards the working volume 3. The light deflection devices 9 are thus, configured to deflect light L1 as emitted by the light sources 4.1 of the first irradiation devices 4 such that the light L1 enters the working volume 3 in two specific positions, namely a first position provided by wall portion 6.2*a* of container wall 6.2 and a second position provided by wall portion 6.3*a* of container wall 6.4. FIG. 1 shows that the two respective light deflection devices 9 can be disposed in an opposite arrangement relative to the working volume 3, which enables that light L1 of the first wavelength enters the working volume 3 from two different sides. As such, the light plane 8 can be built by light L1 entering the working volume 3 from two opposing sides. Each of the light deflection devices 9 is thus assigned to a light source 4.1 of a first irradiation device 4. As such, the first irradiation device 4 comprises two light sources 4.1, wherein a first light source 4.1 emits light L1 of the first wavelength which is deflected by a first light deflection device 9 towards and into the working volume 3 and a second light source 4.1 emits light L1 of the first wavelength which is deflected by a second light deflection device 9 towards and into the working volume 3.

As is apparent from FIG. 1, each respective light deflection device 9 can be or comprise one or more light deflection elements 9.1, such as reflective elements, for instance. According to the embodiment of FIG. 1, the light deflection devices 9 each comprise a base body 9.2, particularly having a cylinder-like or cylindrical base shape, and being rotatably supported e.g. about a rotation axis A1, e.g. its central or symmetrical axis, and having a plurality of light deflection elements 9.1, such as reflective elements, provided with its outer surface. A drive device (not shown), e.g. an electric motor, (electro) magnetic actuator, piezo actuator, etc., can be couplable or coupled with the respective base bodies 9.2 to generate a drive force effecting a rotational motion of the respective base bodies 9.2 about the rotation axis A1. In alternate embodiments, respective light deflection devices 9 could comprise mirrors, particularly moveable mirrors, could be used instead of respective base bodies 9.2.

As indicated above, the light plane 8 is built by or comprises at least one first light projection 7 generated by the light sources 4.1 of the first irradiation device 4. The first light projection 7 comprises multiple light beams traversing, travelling or propagating through the working volume 3. The light plane 8 can be vertically oriented which means that the light plane 8 can vertically extend in the x-y-plane. The light plane 8 can have a lateral spatial extension direction (see x-direction) and a vertical spatial extension direction (see y-direction). The lateral spatial extension direction of light plane 8 can thus, be the spatial extension direction of the light plane 8 in which the multiple light beams traverse, travel or propagate through the working volume 3. The lateral spatial extension direction of the light plane 8 can thus be the lateral distance between an entry point of the container 6, see e.g. container wall portion 6.2*a*, at which the multiple light beams enter the container 6 and an opposed exit point of the container 6, see e.g. container wall portion 6.3*a*, at which the multiple light beams exit the container 6. The vertical spatial extension direction of the light plane 8 can be the spatial extension direction of the light plane 8 between an uppermost light beam of the multiple light beams of the light plane 8 and a lowermost light beam of the multiple light beams of the light plane 8. The lateral spatial extension direction of the light plane 8 can thus be the vertical distance between an uppermost light beam of the multiple light beams and a lowermost light beam of the multiple light beams. The vertical spatial extension direction of the light plane 8 can thus correspond to the height dimension of light plane (see y-direction).

The apparatus 1 further comprises at least one light modulation device 11 assigned to the first irradiation device 4. Particularly, at least one light modulation device 11 can be assigned to each light source 4.1 of the first irradiation device 4. Each respective light modulation device 11 is configured to modulate the spatial extension direction (as indicated by arrows in at least some of FIGS. 2-14) of two or more light beams of the multiple beams of the light plane 8 such that the two or more light beams extend in a non-parallel arrangement relative to each other. A respective light modulation device 11 can be configured to actively and/or passively modify the spatial extension direction and/ or orientation of two or more light beams of the multiple light beams in the light plane 8 such that at least two of the multiple light beams have a non-parallel arrangement relative to each other. The non-parallel arrangement of the at least two light beams in the light plane 8 typically results in that at least two light beams intersect at at least one intersection point P (as exemplarily shown in FIG. 5, for instance) within the light plane 8. Particularly, a plurality of intersection points at which at least two light beams intersect are generated at different positions in the light plane 8. In contrast to light sheets of conventional volumetric 3d-printing apparatuses which comprise a parallel arrangement of (collimated) light beams with no intersecting light beams, the respective light modulation device(s) 11 of the apparatus 1 enable(s) deliberately changing the spatial extension direction and/or orientation of at least two light beams within the light plane 8 such that the at least two light beams extend in a non-parallel arrangement relative to each other within the light plane 8 which results in that one or more intersection points at which two or more light beams intersect are generated within the light plane 8.

Typically, the at least one intersection point in which the at least two light beams of the first wavelength intersect, is arranged within at least one formation zone of the working volume 3. The at least one formation zone comprises a zone of the working volume 3 in which the photocurable resin is cured to form a portion of the three-dimensional to be printed. In exemplary embodiments of the apparatus 1 which implements principles of multi-color photopolymerization, particularly dual-color photopolymerization, the at least one formation zone thus, comprises the zone of the working volume 3 in which the light L1 of the first wavelength intersects with the light L2 of the second wavelength. Hence, the at least one light modulation device 9 can be configured to generate light beams of the first wavelength which intersect in one or more intersection points within the at least one formation zone under a specific angle, particularly an angle between 1-179°, more particularly less than 90°, preferably less than 70°, more preferably less than 50°.

Specifically, the respective light modulation devices 11 can be configured to affect, particularly to at least partly reduce, the optical coherence of light beams within the light plane 8 by deliberately changing the spatial extension direction and/or orientation of at least two light beams such that at least two light beams extend in a non-parallel arrangement relative to each other which results in that two or more light beams intersect at one or more intersection points within the light plane 8. Changing the spatial extension direction and/or orientation of at least two light beams such that at least two light beams extend in a non-parallel arrangement relative to each other within the light plane 8 also results in that the light plane 8 comprises light beams having angled spatial extension directions while traversing, traveling or propagating through the working volume 3. Specifically, at least two light beams can traverse, travel or propagate through the working volume 3 at an angle different from 0° relative to each other. An intersection of at least two light beams at one or more intersection points within the light plane 8 can also comprise that at least two light beams can overlay at the one or more intersection points.

The respective light modulation devices 11 can particularly be configured to direct two or more light beams within the light plane 8 resulting in that the light plane 8 comprises non-parallel and non-coherent light beams, respectively. In contrast to conventional light sheets essentially having a (substantially) rectangular base shape being vertically defined by a parallel arrangement of uppermost and lowermost light beams, the light plane 8 as modified by the one or more respective light modulation devices 11 of the apparatus 1 can have a non-rectangular base shape within the working volume 3, such as e.g. a trapezoidal shape, being vertically defined by non-parallel light beams (see e.g. FIGS. 4-7).

As an example, the respective light modulation device 11 can be configured to generate modified light beams having properties different from a Gaussian beam. As such, a respective light modulation device 11 can be configured to generate modified light beams having a non-Gaussian beam profile, for instance. As an example, a respective light modulation device 11 can be configured to generate modified light beams, namely Airy-beams or Bessel-beams, for instance or light beams having a characteristic similar to Airy-beams or Bessel-beams, for instance.

Figure 3:

In the exemplary embodiment of FIG. 3, it is indicated that both a first light plane 8 generated by a first light modulation device 11 assigned to a first light source 4.1 and a second light plane 8 generated by a second light modulation device 11 (not shown) assigned to a second light source 4.1 (not shown) each can have a non-rectangular base shape within the working volume 3. As such, since the respective non-rectangular first and second light planes 8 overlap within the working volume 3, a resulting light plane R can be generated within the working volume 3 whose shape is defined by the overlapping first and second light planes 8. In the exemplary embodiment, both the first and second light plane 8 have a trapezoidal shape within the working volume 3 such that the resulting light plane R can have, at least in the working volume 3, a hexagon-like base shape (exemplarily indicated by the thick line in FIG. 3) or a hexagonal base shape. A respective resulting light plane R having a hexagon-like base shape or a hexagonal base shape can have upper and lower obtuse angles in an opposite arrangement, for instance.

Similar considerations apply when the respective first and second light planes 8 have other shapes than trapezoidal shapes within the working volume 3 and/or when further light planes 8 generated by further light sources 4.1 with assigned light modulation devices 11 are added.

These principles generally apply to all embodiments, i.e. a resulting light plane R can be present in all embodiments in which respective light planes 8 overlap.

In exemplary configurations in which the first irradiation device 4 comprises two light sources 4.1 as shown in the exemplary embodiment of FIG. 1, a respective light modulation device 11 is assigned to each respective light source 4.1 such that the apparatus 1 can comprise multiple light modulation devices 11. Notably, the light modulation devices 11 are only schematically illustrated in FIG. 1.

Concrete exemplary embodiments of the light modulation device 11 are shown in FIGS. 2-14.

The deliberate generation of respective intersection points at which two or more light beams intersect in the light plane 8 can significantly reduce undesired artefacts and thus, undesired properties, such as (quasi) regular or irregular striping or striation artefacts, resulting in an optical appearance of the manufactured three-dimensional object 2 as if it was built in layers as in conventional additive manufacturing. The respective light modulation device 11 thus, has a positive effect on the properties, i.e, particularly the surface and/or bulk properties, of three-dimensional objects 2 manufactured with the apparatus 1.

FIGS. 2-14 show more concrete embodiments of a respective light modulation device 11. FIGS. 2-14 are simplified illustrations of the apparatus 1 of FIG. 1 in the x-y-plane. Notably, only the left light source 4.1 of the first irradiation device 4 of FIG. 1 is shown for ease of illustration. However, all remarks provided in the following can also apply to the right light source 4.1 (and possibly at least one other light source 4.1) of the first irradiation device 4.

It will be apparent from the exemplary embodiments of FIGS. 2-14 that a respective light modulation device 11 can comprise one or more optically transmissive elements and/or one or more optically reflective elements and/or one or more optically diffractive elements, for instance. Hence, the configuration of a respective light modulation device 11 can be configured to affect the spatial extension direction and/or orientation of light beams of the light plane 8 resulting in that at least two light beams extend in a non-parallel arrangement relative to each other based on one or more transmissive effects and/or one or more reflective effects and/or one or more diffractive effects caused by one or more respective optically transmissive elements and/or one or more respective optically reflective elements and/or one or more respective optically diffractive elements. Non-limiting examples of respective optically transmissive elements are optical elements, e.g. optical lenses, comprising one or more optically transmissive surfaces. Respective optically transmissive surfaces can be built by or comprise one or more optically transmissive coatings, for example. Non-limiting examples of respective optically reflective elements are optical elements, e.g. optical lenses, mirrors, etc., comprising one or more optically reflective surfaces. Respective optically reflective surfaces can be built by or comprise one or more optically reflective coatings, for example. Non-limiting examples of respective optically diffractive elements are optical elements, e.g. optical lenses, etc., comprising one or more optically diffractive surfaces. Respective optically diffractive surfaces can be built by or comprise one or more optically diffractive coatings, for example.

The exemplary embodiments of FIGS. 2-14 specifically show that a respective light modulation device 11 can be arranged in the optical path extending between a respective light source 4.1 of the first irradiation device 4 and the working volume 3. A respective light modulation device 11 can thus, be arranged upstream of the working volume 3. In other words, a respective light modulation device 11 can be arranged outside the working volume 3 and outside the container 6 which comprises the working volume 3, respectively. Particularly, a respective light modulation device 11 can be arranged before an entry point of the container 6 at which the multiple light beams enter the container 6 to form the light plane 8 in the working volume 3. This arrangement of a respective light modulation device 11 outside the container 6 enables that the respective light modulation device 11 does not reduce the working volume 3 and the available build volume, respectively. Also, the respective light modulation device 11 is not in contact with the photopolymerizable material such that any possibly undesired interaction between the photopolymerizable material and the respective light modulation device 11 or components thereof can be avoided.

Figure 2:
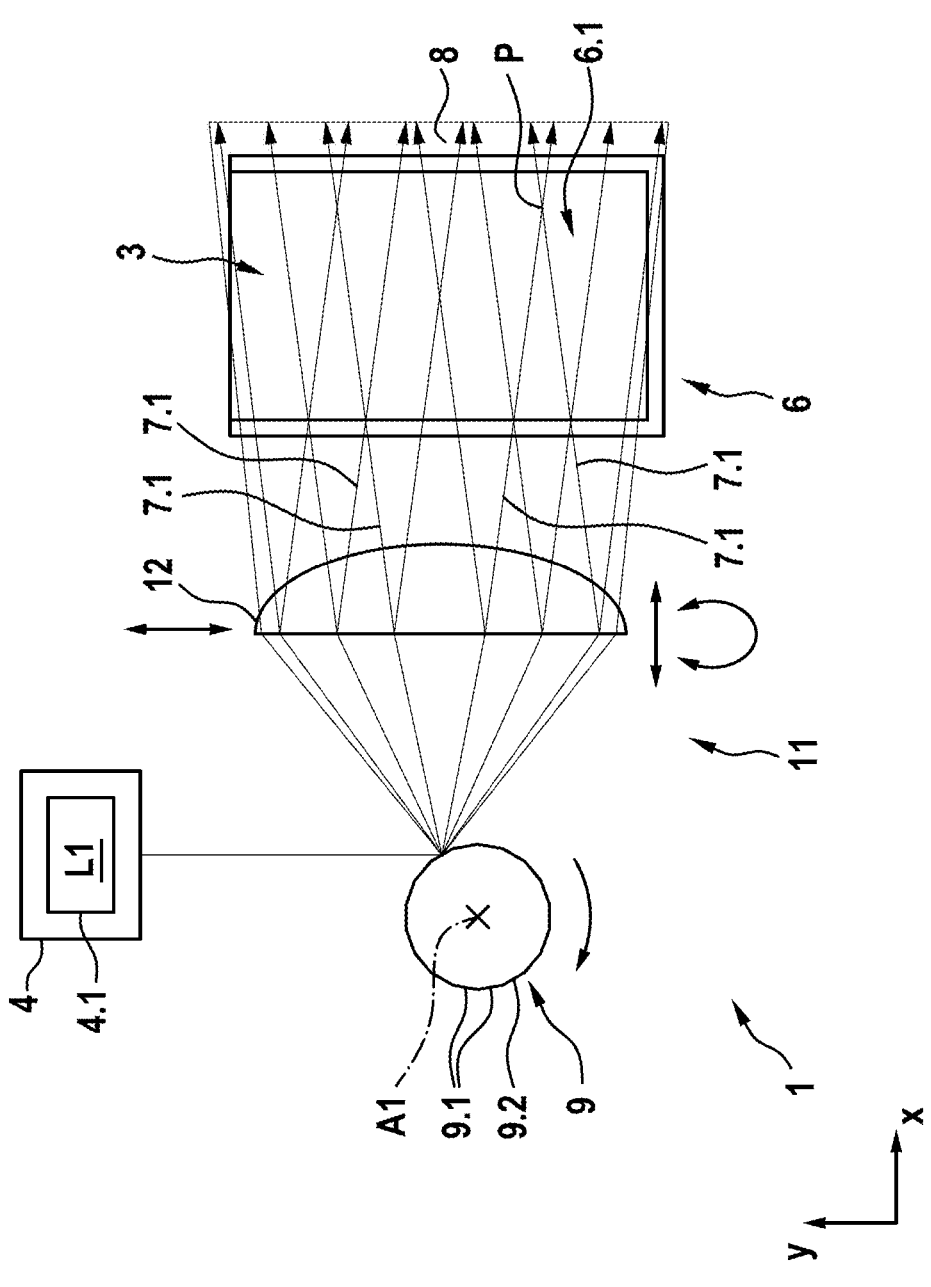

In the exemplary embodiment of FIG. 2, the first irradiation device 4 comprises a generally optional collimator device 12, such as e.g. a collimator lens, configured to collimate the light emitted from the respective light source 4.1 of the first irradiation device 4 before it enters the working volume 3. Instead of a respective collimator device 12, the first irradiation device 4 could generally also comprise an objective device (this applies to all embodiments).

In the exemplary embodiment of FIG. 2, the light modulation device 11 also comprises the collimator device 12 which can be, as indicated in the Fig., moveably supported, e.g. relative to the container 6, in at least one degree of freedom of motion along at least one translation axis and/or about at least one rotation axis as indicated by the two double-arrows in FIG. 2. Any motion of the collimator device 12 results in a respective non-parallel arrangement of light beams in the light plane 8.

Particularly, a respective translation axis can be arranged parallel or non-parallel with respect to an axis defining the lateral spatial extension direction of the light plane 8, for instance. A non-parallel arrangement of a respective translation axis with respect to an axis defining the lateral spatial extension direction of the light plane 8 can comprise an angled arrangement, particularly a perpendicular arrangement, relative to an axis defining the lateral spatial extension direction of the at least one light plane, for instance. In other words, a respective translational motion can comprise an upward and/or downward motion of the collimator device 12 relative to the light source 4.1 or the container 6, for instance. Additionally or alternatively, a respective degree of freedom of motion can comprise a rotational motion of the collimator device 12 about at least one rotation axis. A respective rotation axis can be arranged parallel or non-parallel with respect to an axis defining the lateral spatial extension direction of the light plane 8, for instance. A non-parallel arrangement of a respective rotation axis with respect to an axis defining the lateral spatial extension direction of the light plane 8 can comprise an angled arrangement, particularly a perpendicular arrangement relative to an axis defining the lateral spatial extension direction of the light plane 8, for instance. In other words, a respective rotational motion can comprise a pivot motion or a tilt motion of the collimator device 12 relative to the light source 4.1 or container 6, for instance.

Likewise, the first irradiation device 4 or at least one component thereof, particularly a light source 4.1, can be moveably supported in at least one degree of freedom of motion, particularly relative to the collimator device 12 or the container 6. Hence, the above-mentioned effect of directing light beams such that the at least one light plane comprises non-parallel and/or non-coherent light beams can also be effected or supported by moving the first irradiation device 4 or at least one component thereof, particularly relative to the collimator device 12 or container 6, for instance. A respective degree of freedom of motion can comprise a translational motion of the first irradiation device or at least one component thereof along at least one translation axis. A respective translation axis can be arranged parallel or non-parallel with respect to an axis defining the lateral spatial extension direction of the light plane 8, for instance. A non-parallel arrangement of a respective translation axis with respect to an axis defining the lateral spatial extension direction of the light plane 8 can comprise an angled arrangement, particularly a perpendicular arrangement relative to an axis defining the lateral spatial extension direction of the light plane 8, for instance. In other words, a respective translational motion can comprise an upward and/or downward motion of the first irradiation device 4 or at least one component thereof relative to the collimator device 12 or container 6, for instance. Additionally or alternatively, a respective degree of freedom of motion can comprise a rotational motion of the first irradiation device 4 or at least one component thereof about at least one rotation axis. A respective rotation axis can be arranged parallel or non-parallel with respect to an axis defining the lateral spatial extension direction of the light plane 8, for instance. A non-parallel arrangement of a respective rotation axis with respect to an axis defining the lateral spatial extension direction of the light plane 8 can comprise an angled arrangement, particularly a perpendicular arrangement relative to an axis defining the lateral spatial extension direction of the light plane 8, for instance. In other words, a respective rotational motion can comprise pivot motion of the first irradiation device 4 or at least one component thereof relative to the collimator device 12 or container 6, for instance.

Figure 6:
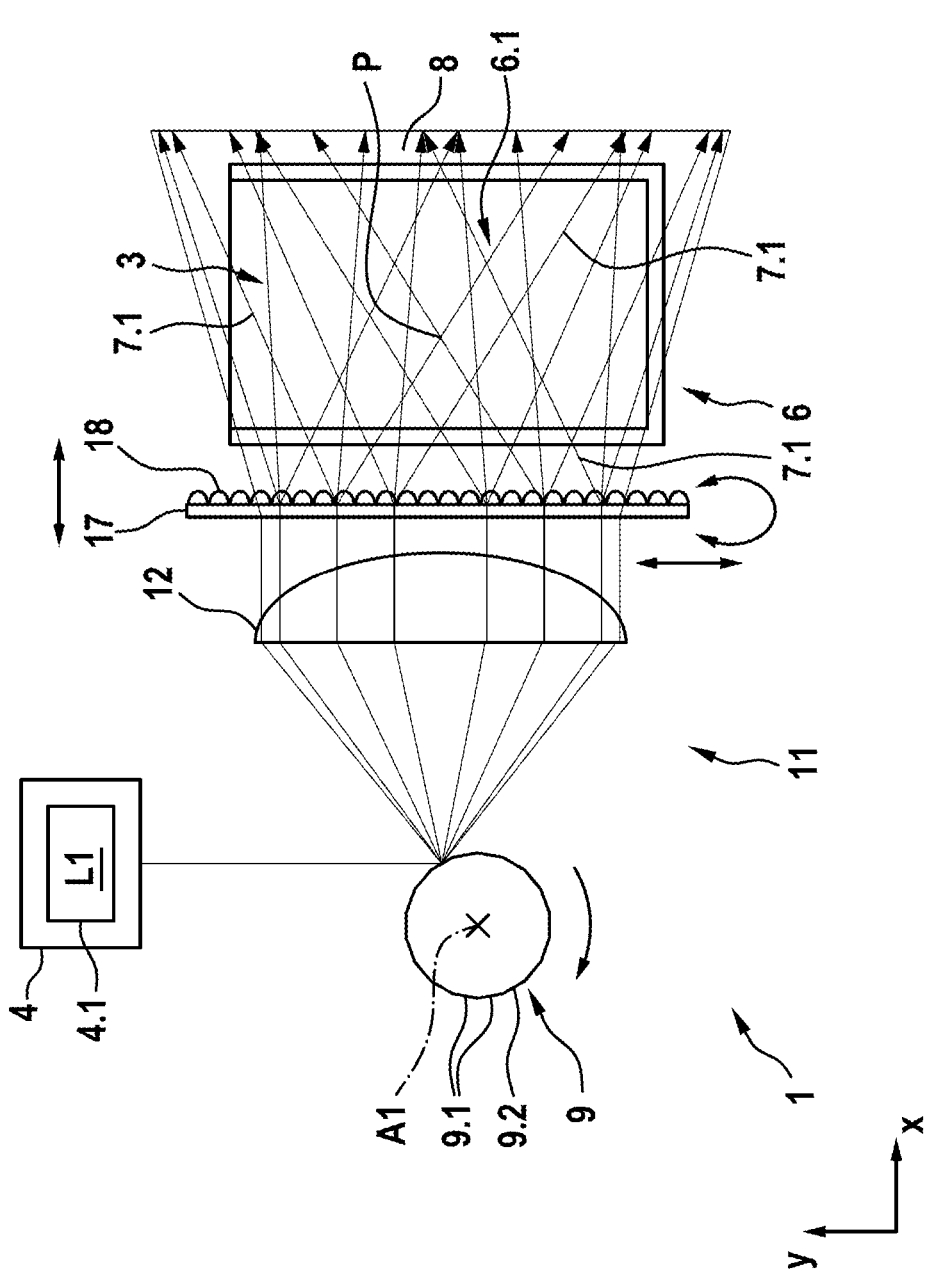

As is exemplarily apparent from the exemplary embodiment of FIG. 6, also a respective light modulation device 11 or at least one component thereof, such as a transmissive element and/or a reflective element and/or a diffractive element, for instance, can be moveably supported in at least one degree of freedom of motion, particularly relative to the respective light source 4 or relative to the working volume 3. Hence, the above-mentioned effect of directing light beams such that the light plane 8 comprises non-parallel and/or non-coherent light beams can also be effected or supported by moving at least one light modulation device 11 or at least one component thereof, particularly relative to the light source 4.1 or container 6, for instance. A respective degree of freedom of motion can comprise a translational motion of the respective light modulation device 11 or at least one component thereof along at least one translation axis. A respective translation axis can be arranged parallel or non-parallel with respect to an axis defining the lateral spatial extension direction of the light plane 8, for instance. A non-parallel arrangement of a respective translation axis with respect to an axis defining the lateral spatial extension direction of the light plane 8 can comprise an angled arrangement, particularly a perpendicular arrangement relative to an axis defining the lateral spatial extension direction of the light plane 8, for instance. In other words, a respective translational motion can comprise an upward and/or downward motion of the respective light modulation device or at least one component thereof relative to the light source 4.1 or container 6, for instance. Additionally or alternatively, a respective degree of freedom of motion can comprise a rotational motion of at least one light modulation device 11 or at least one component thereof about at least one rotation axis. A respective rotation axis can be arranged parallel or non-parallel with respect to an axis defining the lateral spatial extension direction of the light plane 8, for instance. A non-parallel arrangement of a respective rotation axis with respect to an axis defining the lateral spatial extension direction of the light plane 8 can comprise an angled arrangement, particularly a perpendicular arrangement relative to an axis defining the lateral spatial extension direction of the light plane 8, for instance. In other words, a respective rotational motion can comprise a pivot motion or a tilt motion of the respective light modulation device 11 or at least one component thereof relative to the light source 4.1 or container 6, for instance.

Any motion of at least one of: the at least one collimator device 12 (if present), a respective light modulation device 11 or at least one component thereof, or the first irradiation device 4 or at least one component thereof can be effected by at least one drive device (not shown), such as an electric motor, (electro) magnetic actuator, piezo actuator, etc., for instance, which is configured to generate drive forces to move at least one of: the at least one collimator device 12, the respective light modulation device 11 or at least one component thereof, or the first irradiation device 4 or at least one component thereof in at least one respective degree of freedom of motion. A respective drive device is thus directly or indirectly couplable or coupled with the at least one collimator device 12, the respective light modulation device 11 or at least one component thereof, or the first irradiation device 4 or at least one component thereof so as to effect motions of the at least one collimator device 12, the respective light modulation device 11 or at least one component thereof, or the first irradiation device 4 or at least one component thereof in the at least one degree of freedom of motion. In exemplary embodiments, each of the at least one collimator device 12, the respective light modulation device 11 or at least one component thereof, or the first irradiation device 12 or at least one component thereof comprises at least one respective drive device.

Operation of the at least one drive device can be controlled by at least one hardware- and/or software-embodied control unit 15 of the apparatus 1 assigned thereto. The control unit 15 can be, particularly configured to effect regular and/or irregular motions, particularly oscillating motions and/or non-oscillating motions, of the at least one collimator device 12, the respective light modulation device 11 or at least one component thereof, or the first irradiation device 4 or at least one component thereof in the at least one degree of freedom of motion. The control unit 15 can be particularly, configured to implement motion profiles of the at least one collimator device 12, the respective light modulation device 11 or at least one component thereof, or the first irradiation device 4 or at least one component thereof in one or more degrees of freedom of motion. Both regular and irregular motions can reduce respective striping or striation effects and positively influence the surface and/or bulk properties of the three-dimensional object 2 which is to be manufactured with the apparatus 1. In exemplary embodiments, in which each of the at least one collimator device 12, a respective light modulation device 11 or at least one component thereof, and first irradiation device 4 or at least one component thereof comprises at least one respective drive device, operation of the respective drive devices can be controlled dependent or independent from each other. Particularly, respective motion profiles can be implemented by a dependent or independent control of the operation of respective drive devices assigned to the at least one collimator device 12, the respective light modulation device 11 or at least one component thereof, and the first irradiation device 4 or at least one component thereof.

In the exemplary embodiment of FIG. 3 it is shown that a respective light modulation device 11 can be disposed or built between a respective collimator device 12 and the working volume 3. Hence, a respective light modulation device 11 can be disposed in the optical path of the light beams after they passed through the collimator device 12 (downstream of the collimator device) such that the light which passes through the collimator device 12 does not necessarily comprise at least two light beams already having a non-parallel arrangement relative to each other. In such a configuration, the collimator device 12 does not necessarily influence the above-mentioned effect of directing light beams such that the light plane 8 comprises non-parallel and/or non-coherent light beams at least when there is no further light modulation device 11 in an upstream arrangement.

As such, a respective light modulation device 11 can additionally or alternatively be disposed or built between the light source 4.1 and the collimator device 12, for instance. Hence, a respective light modulation device 11 can additionally or alternatively be disposed in the optical path of the light beams before they pass through the collimator device 12 (upstream of the collimator device) such that the light which passes through the collimator device 12 can comprise at least two light beams already having a non-parallel arrangement relative to each other. In such a configuration, the collimator device 12 can influence the above-mentioned effect of directing light beams such that the light plane 8 comprises non-parallel and/or non-coherent light beams.

In the exemplary embodiment of FIG. 3, the light modulation device 11 is embodied as a diffuser device, particularly an elliptical diffuser device. Particularly, the light modulation device 11 comprises multiple optical elements, namely diffuser elements 16, arranged on one side of substrate element 17. The optical elements form respective components of the light modulation device 11. Each optical element can be configured to change the original spatial extension direction and/or orientation of an incident light beam so as to generate a light beam having a different spatial extension direction and/or orientation relative to the original spatial direction and/or orientation. Hence, each optical element can be configured to generate at least one light beam with a modified spatial extension direction and/or orientation relative to an original spatial extension direction and/or orientation. Particularly, at least one optical element can be configured to generate multiple light beams each with a modified spatial extension direction and/or orientation relative to a respective original spatial extension direction and/or orientation. As such, a respective optical element can generate at least one light plane comprising two or more light beams having the desired non-parallel arrangement relative to each other.

Figure 4:
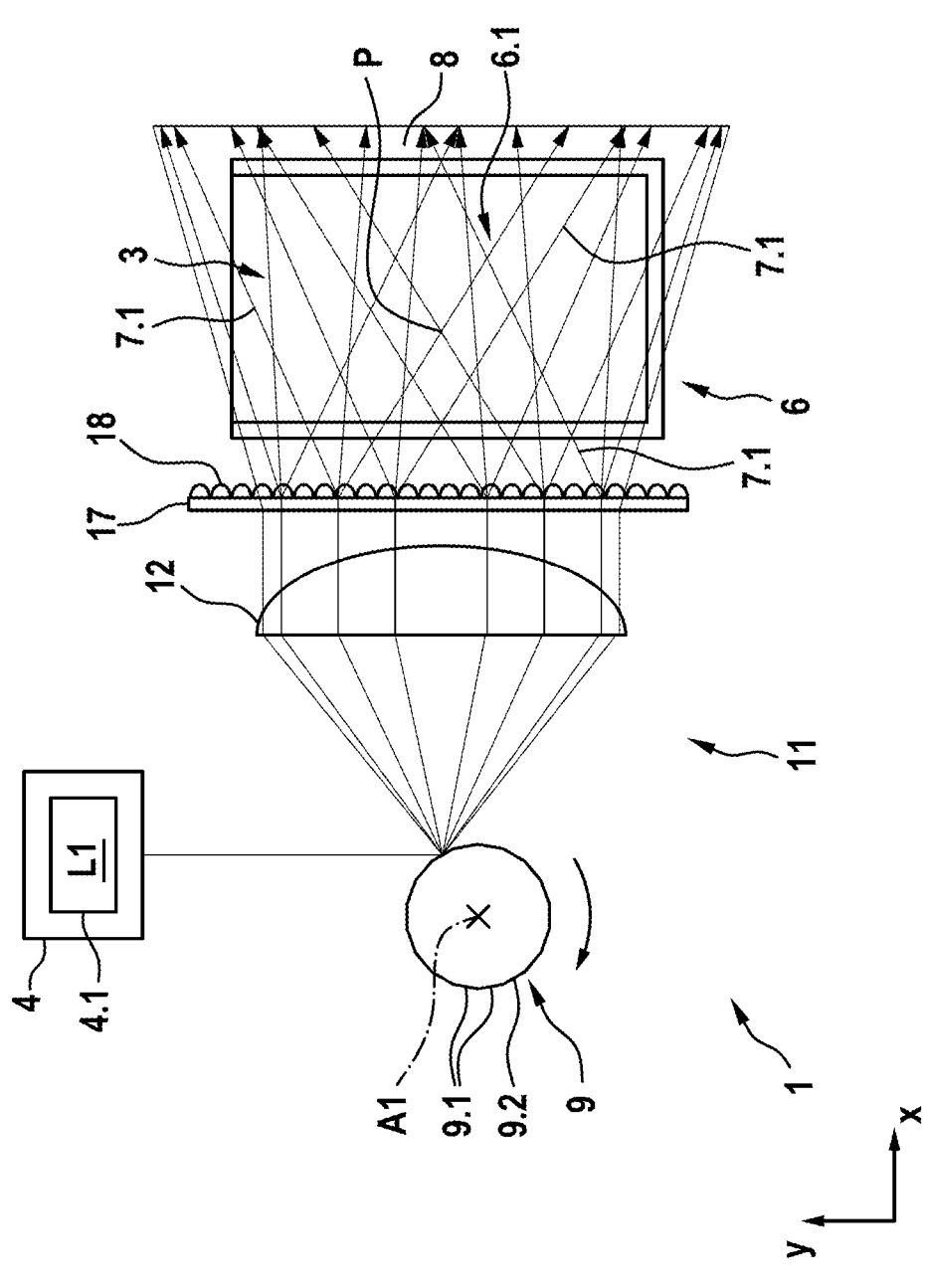

In the exemplary embodiment of FIG. 4, the light modulation device 11 is embodied as a microlens device. Particularly, the light modulation device 11 comprises multiple optical elements, namely microlens elements 18, particularly cylindrical microlens elements, arranged on one side of substrate element 17. The optical elements form respective components of the light modulation device 11. Each optical element can be configured to change the original spatial extension direction and/or orientation of an incident light beam so as to generate a light beam having a different spatial extension direction and/or orientation relative to the original spatial direction and/or orientation. Hence, each optical element can be configured to generate at least one light beam with a modified spatial extension direction and/or orientation relative to an original spatial extension direction and/or orientation. Particularly, at least one optical element can be configured to generate multiple light beams each with a modified spatial extension direction and/or orientation relative to a respective original spatial extension direction and/or orientation. As such, a respective optical element can generate at least one light plane comprising two or more light beams having the desired non-parallel arrangement relative to each other.

Both respective optical elements shown in the exemplary embodiments of FIG. 3, FIG. 4, and FIG. 6 can be arranged in at least one row and/or column. The respective light modulation device 11 can thus, comprise an arrangement of respective optical elements in at least one row and/or at least one column. Respective optical elements can thus, be arranged in a one- or multi-dimensional array comprising at least one row comprising at least one optical element and/or at least one column comprising at least one optical element.

In the exemplary embodiments of FIG. 3, FIG. 4, and FIG. 6, the optical elements are arranged or built on one side of the respective substrate element 17. The light modulation device 11 thus, comprises at least one substrate element 17 having one or more respective optical elements arranged or built on at least one side thereof. A respective substrate element 17 can comprise a first side and a second side opposing the first side. In the exemplary embodiment of FIG. 5, one or more optical elements are arranged or built on both the first and second side of the substrate element 17. The light modulation device 11 can thus, be embodied as a so-called cylindrical fly's eye condenser in this embodiment.

Figure 5:
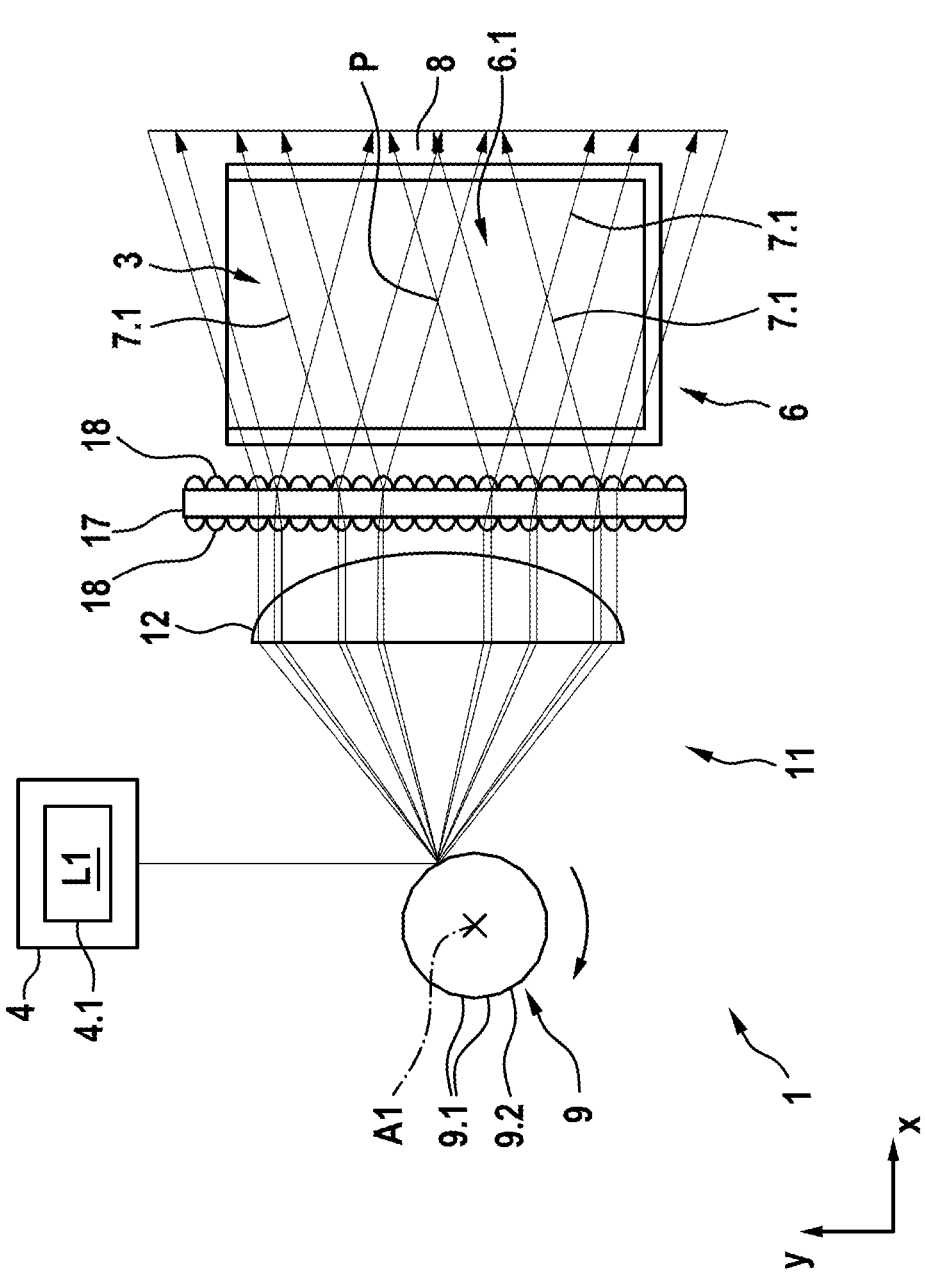

For the sake of completeness, it is remarked that the arrangement of the substrate element 17 and the respective optical elements attached thereto downstream of the collimator device 12, which is generally optional, in the exemplary embodiments of FIG. 3-5 is only an example. Likewise, an arrangement of the substrate element 17 and the respective optical elements attached thereto upstream of the collimator device 12 is conceivable. As such, at least one respective substrate element 17 and respective one or more optical elements arranged or built on at least one side thereof can be disposed upstream or downstream of a respective collimator device 12 which is arranged in the optical path extending between a light source 4.1 of the first irradiation device 4 and the container 6.

Figure 7:
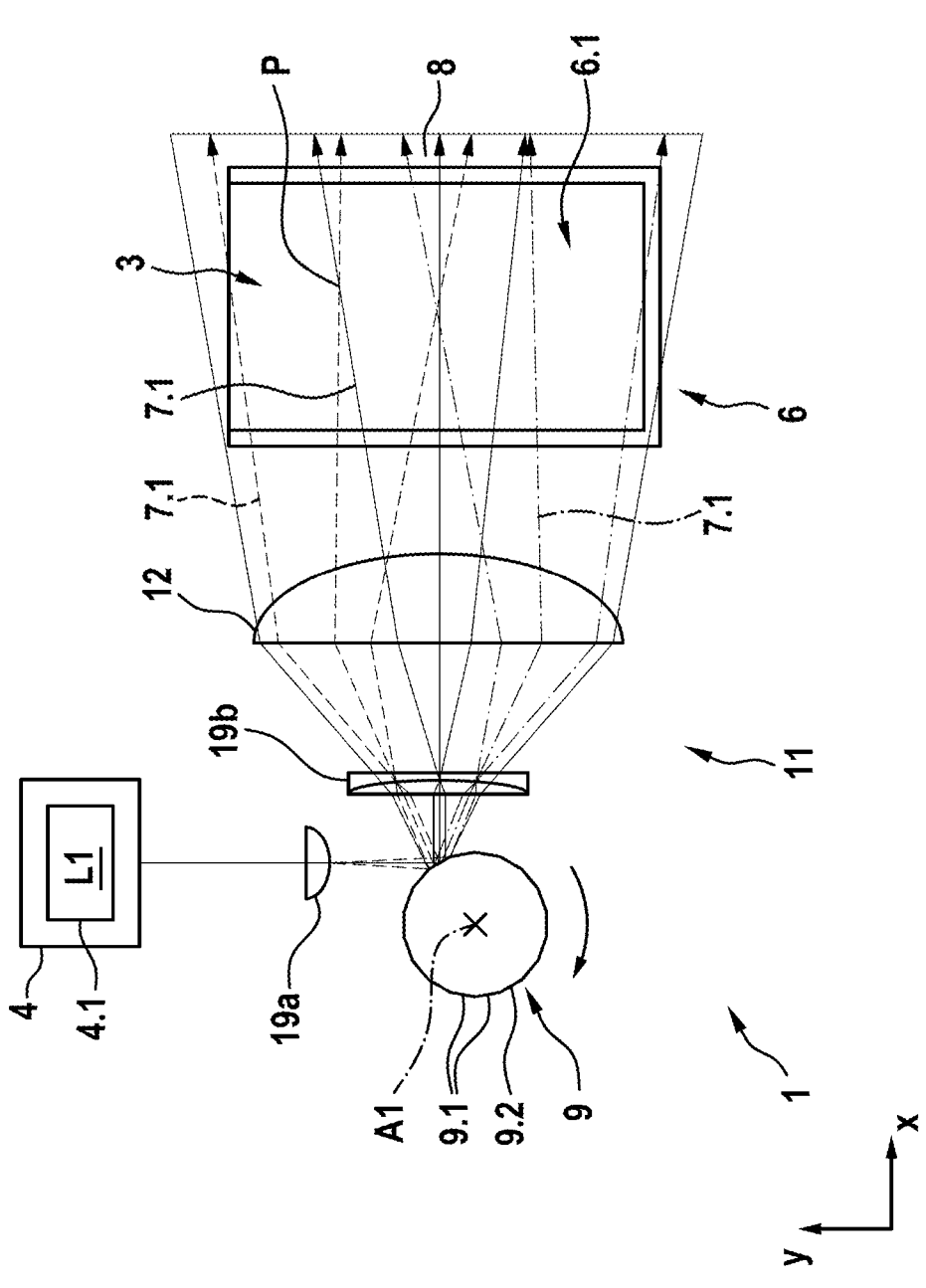

In the exemplary embodiment of FIG. 7, the respective light modulation device 11 comprises at least one first optical lens, particularly a plano-convex lens 19a or a freeform lens, arranged upstream of the light deflection device 9 and at least one second optical lens, particularly a plane-concave lens 19b or a freeform lens, arranged downstream of the light deflection device 9. An arrangement of the first optical lens upstream of the light deflection device 9 means that the first optical lens is arranged in a portion of the optical path extending between the light source 4.1 of the first irradiation device 4 and the light deflection device 9. An arrangement of the second optical lens downstream of the light deflection device 9 means that the second optical lens is arranged in a portion of the optical path extending between the light deflection device 9 and the working volume 3.

The first optical lens and its arrangement upstream of the light deflection device 12 can be particularly useful for generating light having a line profile. Generating light having a line profile can be particularly, useful in combination with the second optical lens disposed in between the light deflection device 9 and the collimator device 12 (optional) arranged upstream of the working volume 3.

Figure 8:
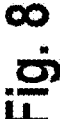
Figure 9:
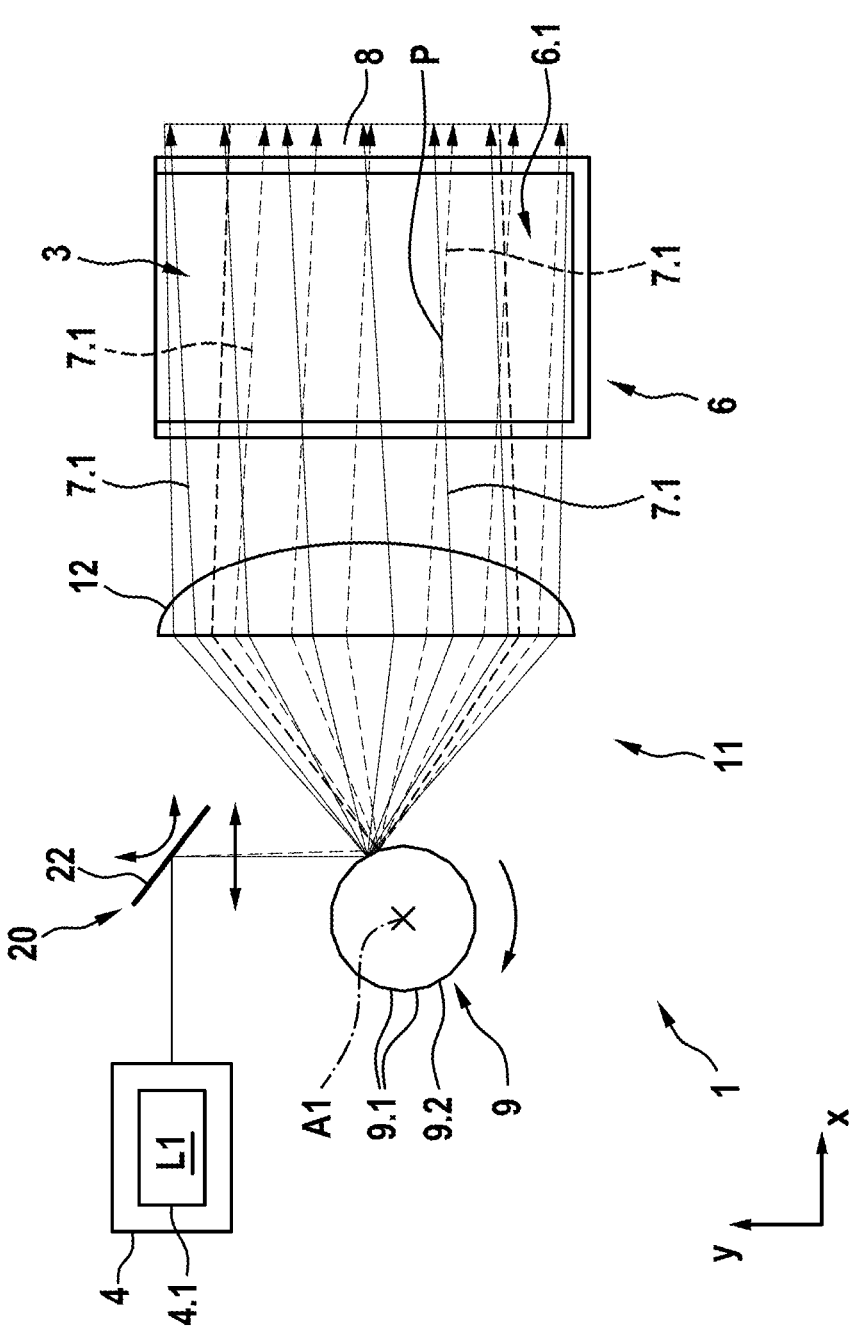
Figure 9:

In the exemplary embodiments of FIG. 8 and FIG. 9, the respective light modulation device 11 comprises a beam steering device 20 arranged upstream of the light deflection device 9. The beam steering device 20 is configured to change the spatial extension direction and/or orientation of at least one light beam emitted from the light source 4.1 of the first irradiation device 4 towards the light deflection device 9 in the upstream arrangement. Hence, the desired non-parallel arrangement of at least two light beams relative to each other within the light plane 8 can also be effected or supported by a beam steering device 20 arranged upstream of the light deflection device 9. An arrangement of the at least one beam steering device upstream of the light deflection device 9 means that the beam steering device 20 is arranged in a portion of the optical path extending between the light source 4.1 of the first irradiation device 4 and the light deflection device 9.

In the exemplary embodiment of FIG. 8, the beam steering device 20 comprises at least one optically transmissive element 21, e.g. a glass plate, moveably supported in at least one degree of freedom of motion (as exemplarily indicated by the double-arrow). The beam steering device 20 can be configured to change the spatial extension direction and/or orientation of at least one light beam emitted from the light source 4.1 of the first irradiation device 4 towards the light deflection device 9 via one or more motions of the at least one optically transmissive element 21 in the at least one degree of freedom of motion. A respective degree of freedom of motion can be or comprise a translational motion of the at least one optically transmissive element 21 along a translation axis and/or a rotational motion, e.g. a pivot motion or a tilt motion, of the at least one optically transmissive element 21 about a rotation axis. Motions of the at least one optically transmissive element 21 can be synchronized with rotational motions of the base body 9.2 of the light deflection device 9 by means of at least one hardware- and/or software-embodied control unit 15 which can be configured to control motions of the at least one optically transmissive element 21 and the base body 9.2.

In the exemplary embodiment of FIG. 9, the beam steering device 20 comprises at least one optically reflective element 22, e.g. a mirror, moveably supported in at least one degree of freedom of motion (as exemplarily indicated by the double-arrow). The beam steering device 20 can be configured to change the spatial extension direction and/or orientation of at least one light beam emitted from the light source 4.1 of the first irradiation device 4 towards the light deflection device 9 via one or more motions of the at least one optically reflective element 22 in the at least one degree of freedom of motion. A respective degree of freedom of motion can be or comprise a translational motion of the at least one optically reflective element 22 along a translation axis and/or a rotational motion, e.g. a pivot motion or a tilt motion, of the at least one optically reflective element 22 about a rotation axis. Motions of the at least one optically reflective element 22 can be synchronized with rotational motions of the base body 9.2 of the light deflection device 9 by means of at least one hardware- and/or software-embodied control unit 15 which can be configured to control motions of the at least one optically reflective element 22 and the base body 9.2.

Figure 10:
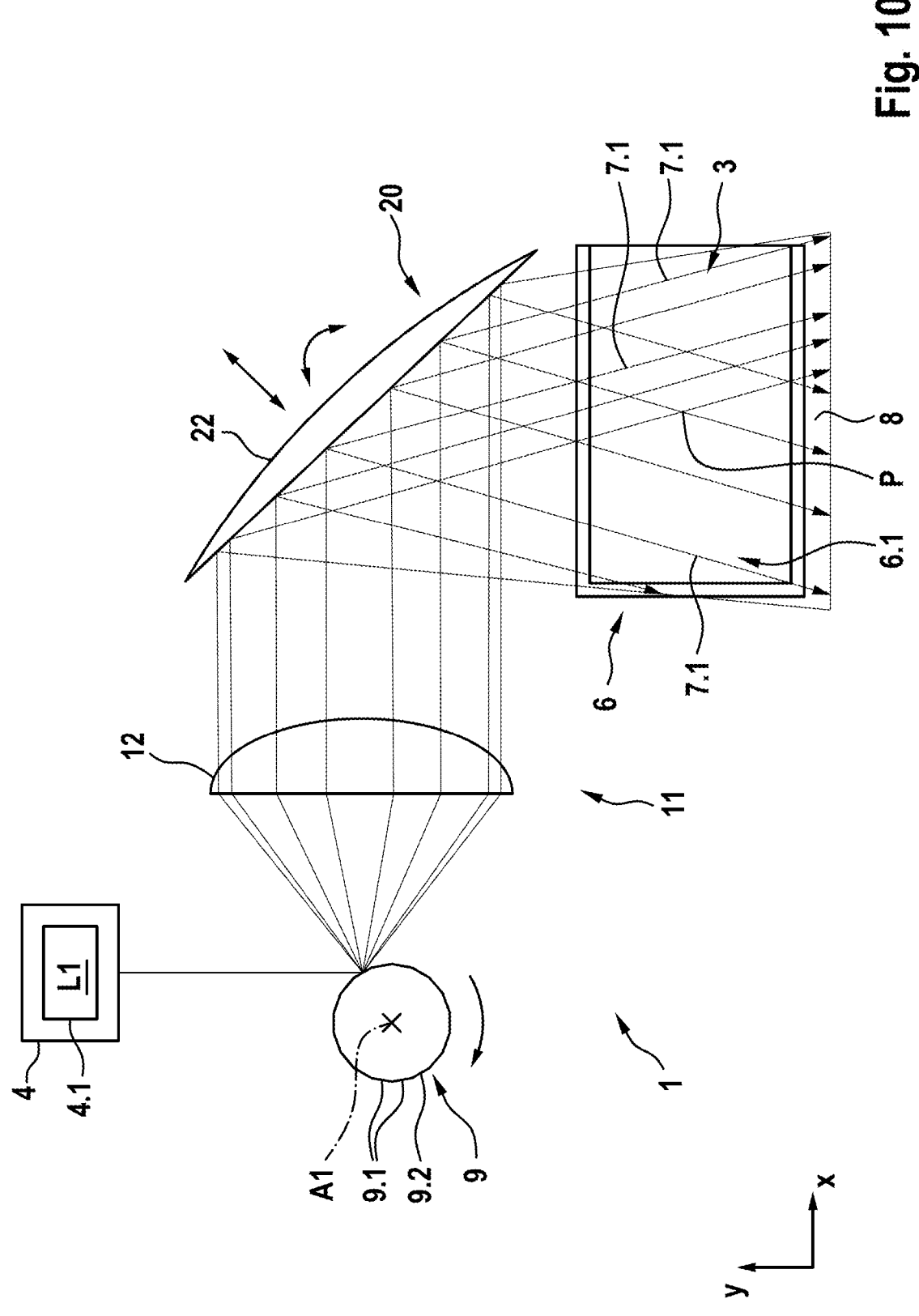

In the exemplary embodiment of FIG. 10, a respective beam steering device 20 is arranged downstream of the light deflection device 9. The beam steering device 20 is configured to change the spatial extension direction and/or orientation of at least one light beam emitted from the light source 4.1 of the first irradiation device 4 towards the working volume 3 in the downstream arrangement. Hence, the desired non-parallel arrangement of at least two light beams relative to each other within the light plane 9 can also be effected or supported by a beam steering device 20 arranged downstream of the light deflection device 9. An arrangement of the at least one beam steering device downstream of the light deflection device 9 means that the beam steering device 20 is arranged in a portion of the optical path extending between the light deflection device 9 and the working volume 3.

In the exemplary embodiment of FIG. 10, the beam steering device 20 comprises at least one optically reflective element 22, e.g. a mirror, moveably supported in at least one degree of freedom of motion (as exemplarily indicated by the double-arrows). The beam steering device 20 can be configured to change the spatial extension direction and/or orientation of at least one light beam emitted from the light source 4.1 of the first irradiation device 4 towards the light deflection device 9 via one or more motions of the at least one optically reflective element 22 in the at least one degree of freedom of motion. A respective degree of freedom of motion can be or comprise a translational motion of the at least one optically reflective element 22 along a translation axis and/or a rotational motion, e.g. a pivot motion or a tilt motion, of the at least one optically reflective element 22 about a rotation axis. Motions of the at least one optically reflective element 22 can be synchronized with rotational motions of the base body 9.2 of the light deflection device 9 by means of at least one hardware- and/or software-embodied control unit 15 which can be configured to control motions of the at least one optically reflective element 22 and the base body 9.2.

Figure 11:
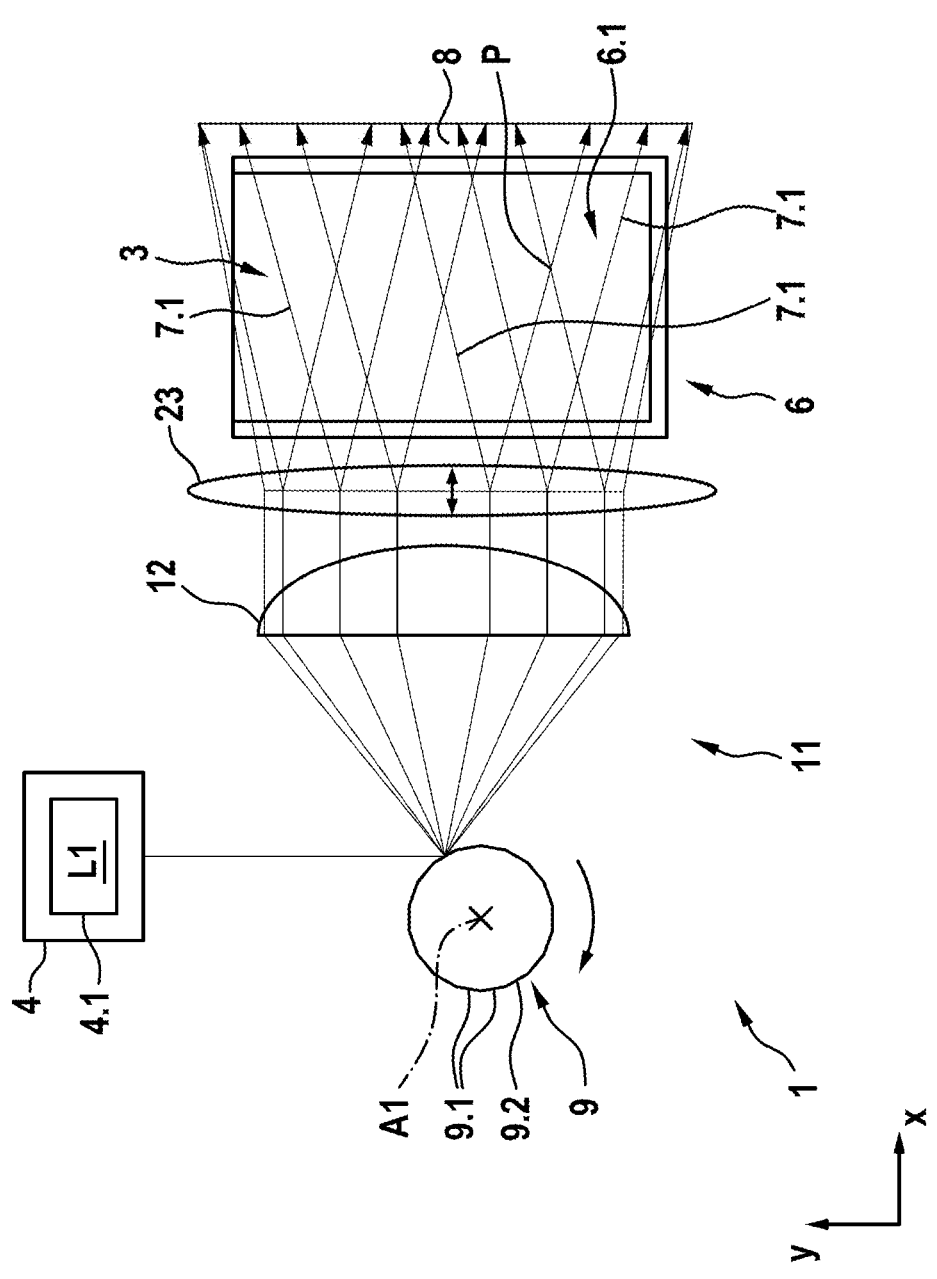

In the exemplary embodiment of FIG. 11, the light modulation device 11 comprises an adaptive optical element 23 having an adaptive shape and thus, a variable shape. An adapted and thus, variable shape means that the adaptive optical element 23 can vary its geometric dimensions, e.g. its length and/or width, and/or height, particularly relative to a reference state, in at least one spatial direction. The adaptive optical element 23 can thus, be configured to change the spatial extension direction and/or orientation of at least one light beam via one or more adaptive changes or variations of its shape. As is shown in FIG. 11, the adaptive optical element 23 can be particularly, arranged downstream of the deflection device 9 and downstream of a respective collimator device 12 (if present). The adaptive optical element 23 can be particularly, configured to dynamically change the focal length of the light beams incident in the working volume 3 based on respective changes of its shape. The hardware- and/or software-embodied control unit 15 can be assigned to the adaptive optical element 23. The control unit 15 can be configured to control changes and/or variations of the shape of the adaptive optical element 23.

The adaptive optical element 23 can be built as or comprise an adaptive optically transmissive element, particularly an adaptive lens, more particularly a liquid lens, or an adaptive optically reflective element, particularly an adaptive reflective mirror, more particularly liquid mirror, for instance.

Figure 12:
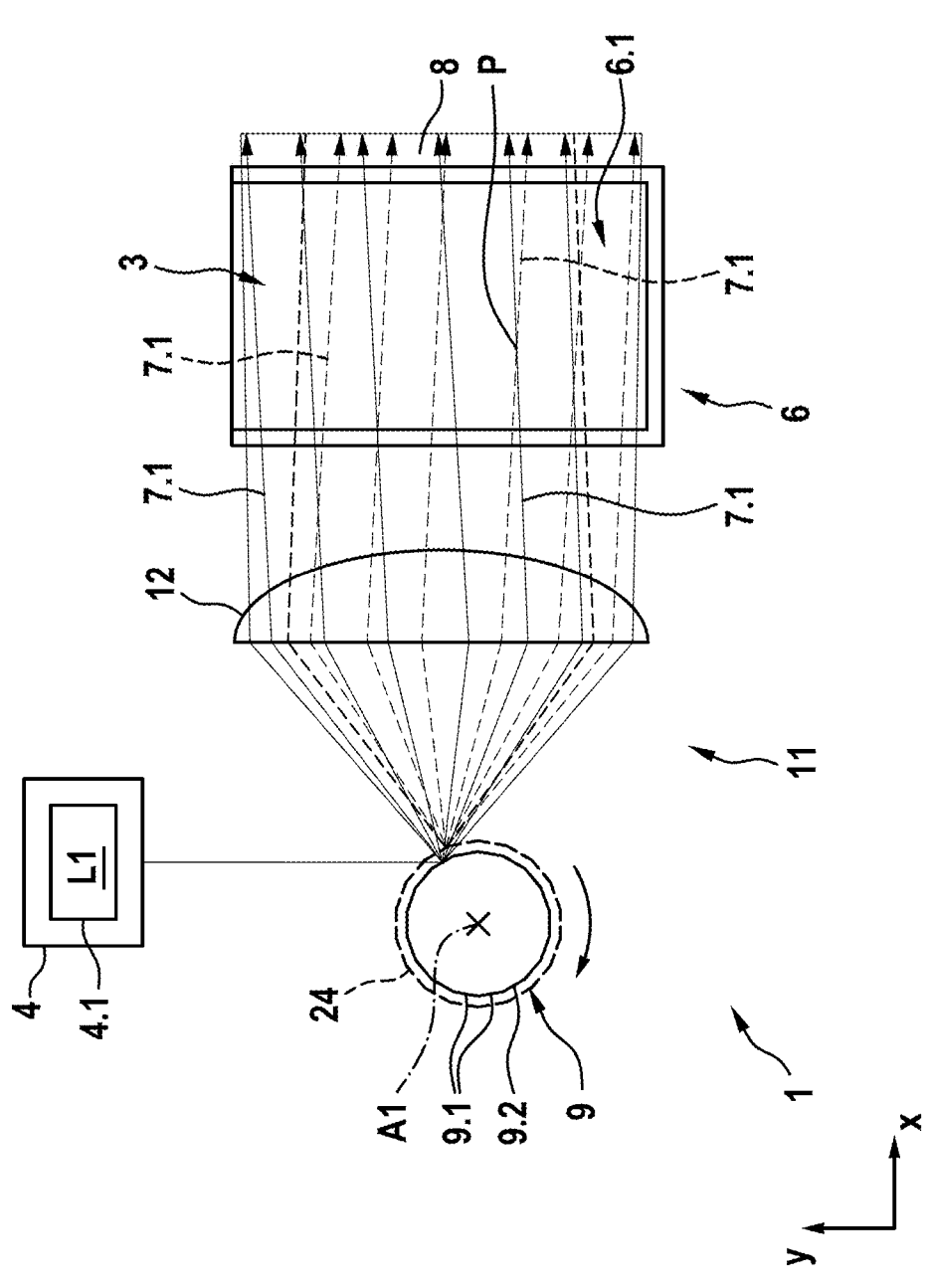

In the exemplary embodiment of FIG. 12, the light modulation device 11 comprises one or more optical modulation elements 24 attached to the outer surface of the base body 9.2 of the light deflection device 9. Particularly, each respective optical modulation element 24 can be attached to the outer surface of a respective light deflection element 9.1 provided with the outer surface of the base body 9.2. Respective optical modulation elements 24 can be refractive elements, such as e.g. glass elements, which can effect the desired non-parallel arrangement of at least two light beams within the light plane 8.

Figure 13:
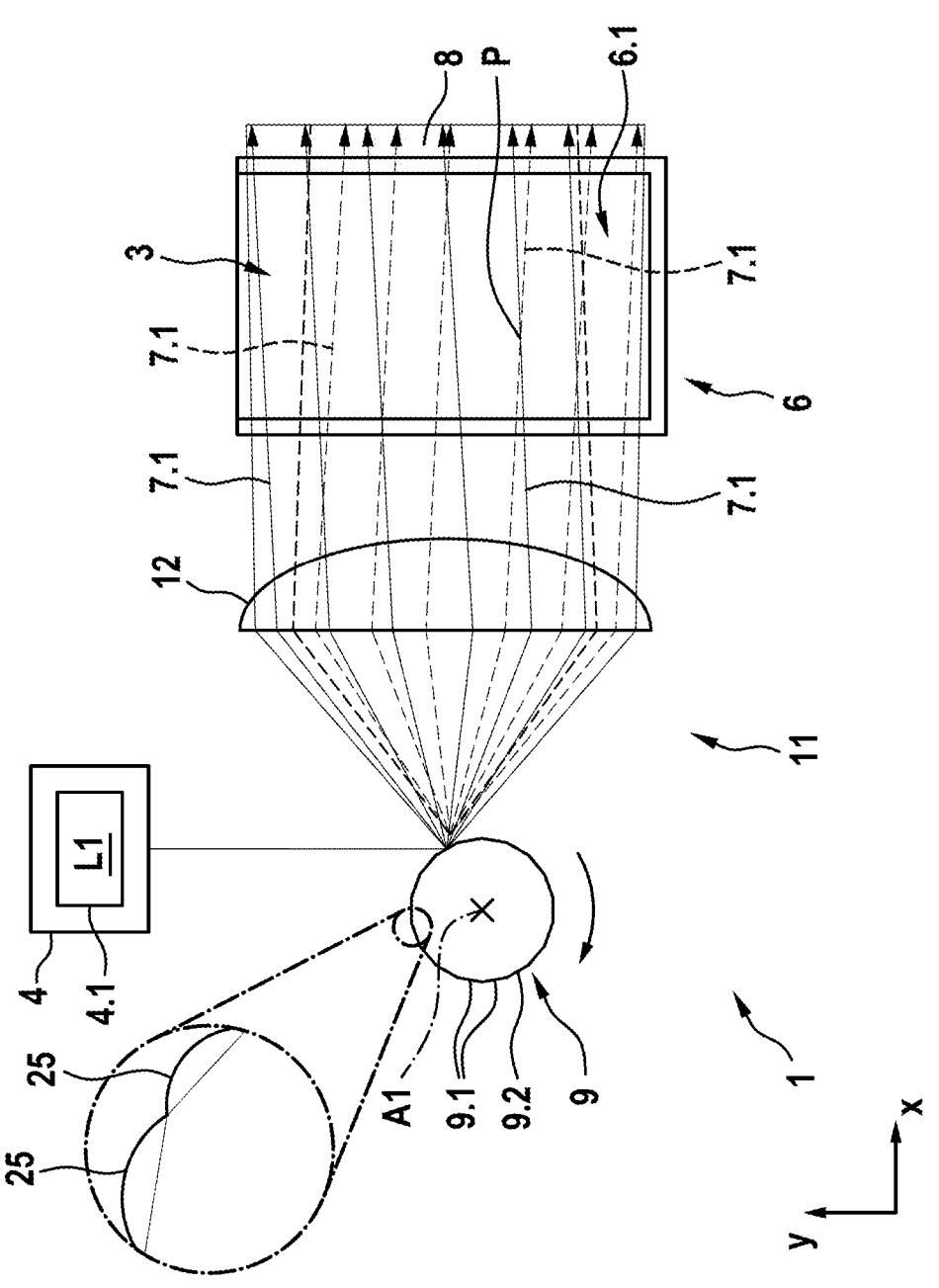

In the exemplary embodiment of FIG. 13, the light modulation device 11 comprises a one- or multi-dimensional surface structuring 25 of the outer surface of the base body

9.2 of the light deflection device 9. A respective one- or multi-dimensional surface structuring 25 of the outer surface of the base body 9.2 can comprise a specific arrangement, e.g. an alternating arrangement, of reflective and/or refractive elements on the outer surface of the base body 9.2. Respective reflective and/or refractive elements can have the same shape or different shapes. As an example, a respective one- or multi-dimensional surface structuring of the outer surface of the base body 9.2 can comprise a specific arrangement, e.g. an alternating arrangement, of reflective and/or refractive elements having convex shapes, concave shapes, cylindrical shapes, polygonal shapes, etc. Additionally or alternatively, a respective one- or multi-dimensional surface structuring of the outer surface of the base body 9.2 can comprise chemical and/or physical modifications of the surface of light deflection elements 9.1 provided with the outer surface of the base body 9.2. Respective chemical and/or physical modifications can be implemented by deposition processes in which at least one optically effective deposition material is deposited on at least one light deflection element 9.1 so as to modify its optical properties, etching process in which the surface of at least one light deflection element 9.1 is etched so as to modify its optical properties, etc.

Figure 14:
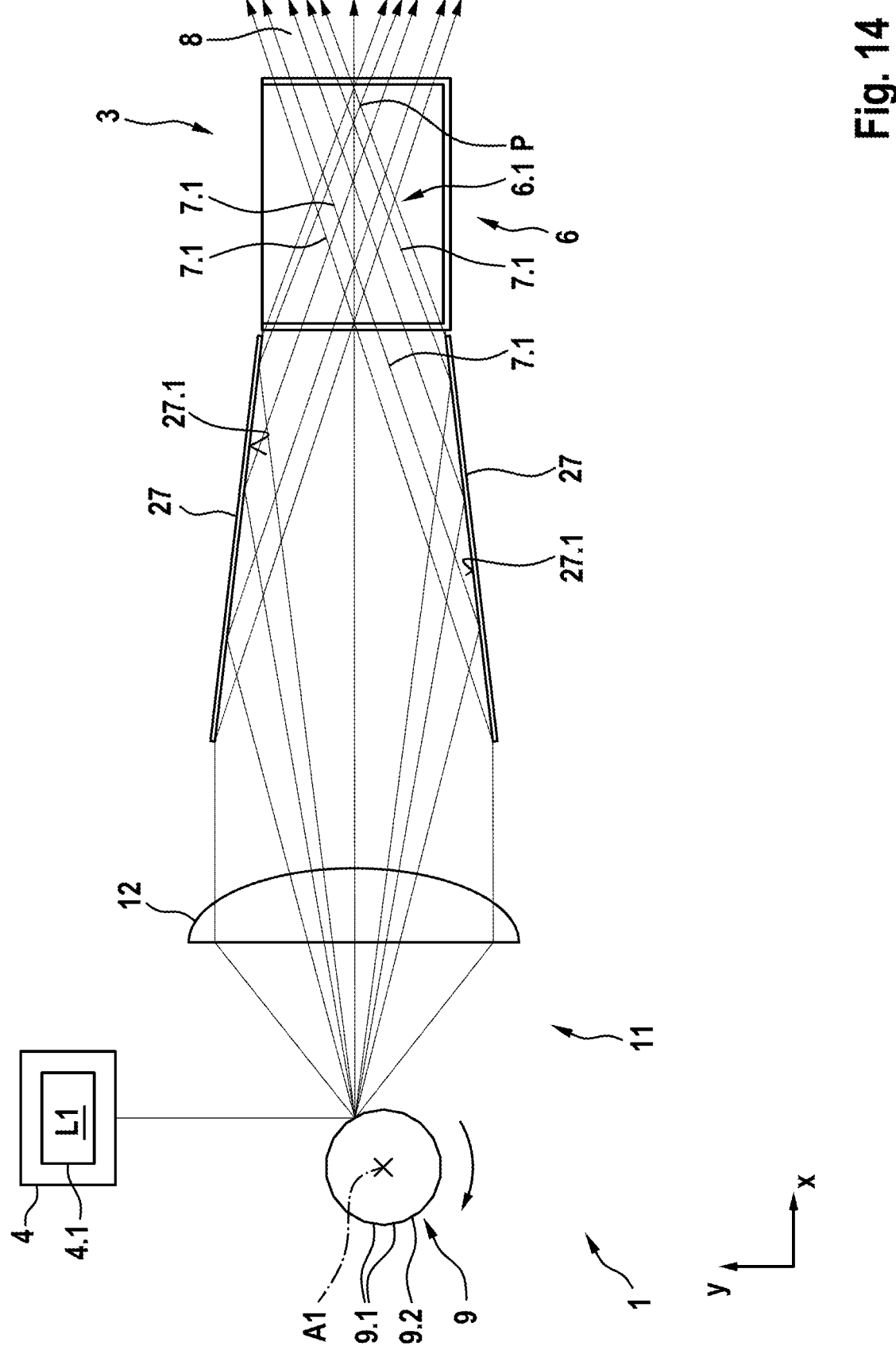

In the exemplary embodiment of FIG. 14, the light modulation device 11 comprises an exemplary opposing arrangement of multiple optically reflective elements 27, e.g. mirrors, each having an inclined surface relative to the initial spatial extension direction of the light beams which have passed through an optional collimator device 12. The inclined surfaces 27.1 of the optically reflective elements 27 are configured to change, via reflection, the spatial extension direction and the orientation of the spatial extension direction, respectively of incident light beams such that the light beams intersect with other light beams in the working volume 3.

Notably, at least one respective optically reflective element 27 can be moveably supported in at least one degree of freedom of motion, e.g. in a rotational degree of freedom of motion, as indicted above in context with other embodiments such that the respective annotations apply in analogous manner.

In either embodiment, it is also conceivable that the container 6 is moveably supported in at least one degree of freedom of motion, e.g. relative to at least one light source 4.1 of the first irradiation device 4.1 to effect or support the desired non-parallel arrangement of at least two light beams within the light plane 8, e.g. due to refractive effects of the material forming the container walls 6.2-6.5. As indicated further above, at least some of the container walls 6.2-6.5 can enable refractive effects to at least some degree such that motions of the container 6 in at least one degree of freedom of motion can effect or support the desired non-parallel arrangement of at least two light beams within the light plane 8.

In either embodiment, the apparatus 1 can comprise a determination device 26 configured to determine the surface and/or bulk properties of a three-dimensional object 2 being manufactured with the apparatus. The determination device 26 can comprise a detection unit 26.1, e.g. an optical detection unit, such as a camera, for instance, configured to detect information indicative of the surface and/or bulk properties of a three-dimensional object 2 being manufactured with the apparatus 1. Such information indicative of the surface and/or bulk properties of a three-dimensional object being manufactured with the apparatus 1 can be communicated to the control unit 15 which can be configured to control operation of the light modulation device(s) 11. In such a manner, a process control loop can be implemented. This particularly, applies when respective information indicative of the surface and/or bulk properties of a three-dimensional object 2 being manufactured with the apparatus 1 is used for an online control of the operation of the at least one light modulation device(s) 11.

Even if not explicitly shown in the Fig., the or at least one light modulation device 11 can be configured to generate incoherent light. A respective light modulation device 11 can thus, comprise an incoherent light source, such as e.g. a light emitting diode, configured to generate incoherent light and/ or an optical light guide, such as e.g. an optical fiber, configured to alter the properties of coherent light such that incoherent light is obtained. Incoherent light can comprise respective intersecting light beams and thus, effect the desired intersection of light beams in the working volume 3.

Each of the exemplary apparatuses 1 shown in the Fig. enables implementing a method for volumetric 3d-printing to form a three-dimensional object 2. The method comprises at least the following steps: generating, via a respective first irradiation device 4 configured to irradiate light L1 of a first wavelength into the working volume 3 comprising a photopolymerizable material, particularly a photopolymerizable polymer resin, a first light projection 7 in the working volume 3, the first light projection 7 comprising multiple light beams traversing the working volume 3 in a light plane 8; and modulating, via at least one light modulation device 11 assigned to the first irradiation device 4, the spatial extension direction of two or more light beams of the multiple beams in the light plane 8 such that the two or more light beams extend in a non-parallel arrangement relative to each other.

Preferably, the method is performed with light of at least two different wavelengths, wherein a first wavelength is used for generating or projecting a respective light plane 8, and a further wavelength is used for generating or projecting respective images of cross-sections of the three-dimensional object 2 to be built. The first wavelength is typically smaller than the further wavelength. The method thus preferably implements principles of so-called dual-color photopolymerization.

Figure 15:
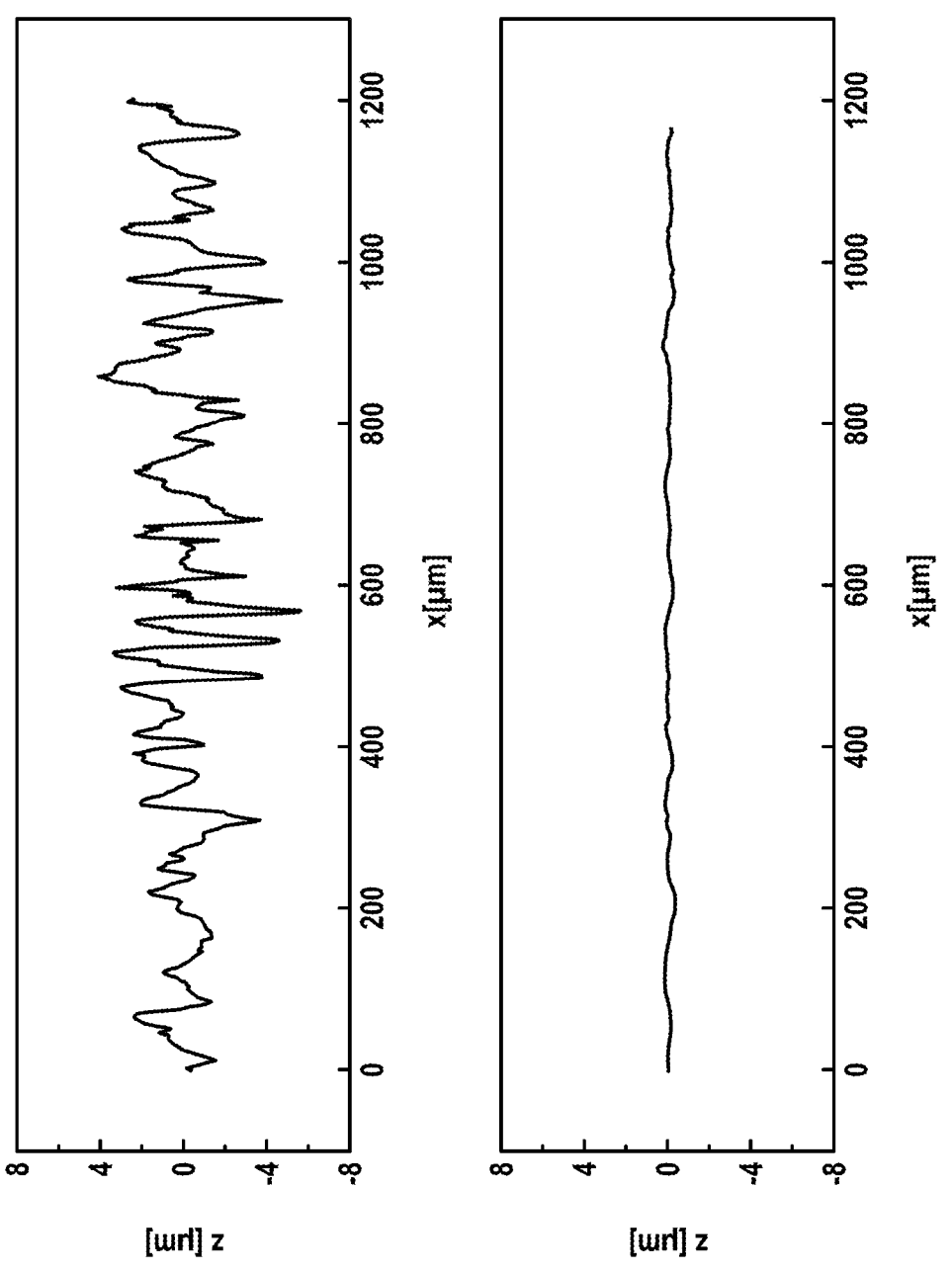
FIG. 15 shows exemplary experimental results of the properties of an object manufactured in accordance with an exemplary embodiment and the properties of a reference object not manufactured in accordance with an exemplary embodiment.

FIG. 15 shows exemplary experimental results of the properties of an object manufactured in accordance with an exemplary embodiment (lower illustration) and the properties of a reference object not manufactured in accordance with an exemplary embodiment (upper illustration). The test results relate to measured surface properties indicative of a surface roughness of the respective objects.

The Fig. clearly shows that the object manufactured in accordance with an exemplary embodiment, i.e. by using a light modulation device 11, has a smoother surface profile than the reference object which has been manufactured by a similar volumetric printing process but without using a light modulation device 11.

Both objects have been formed by a photopolymerization of a liquid photopolymerizable material having the following composition:

| | | |
|---|---|---|
| Urethane methacrylate oligomer | 70 | wt % |
| Acryloyl morpholine (ACMO) | 25 | wt % |
| N-Methyldiethanolamine (MDEA) | 5 | wt % |
| Dual-color-photoinitiator (spiropyran-based) | 0.02 | wt % |

The reference object was a rectangular cuboid (dimensions x,y,z: 7×14×1 mm). After printing, the reference object was removed from the container and washed in a bath containing tripropyleneglycol monomethyl ether (TPM) for 5 min. The reference object was removed from the bath and remaining TPM was washed away with ethanol before the reference object was dried in air for 10 min. Finally, the reference object was post-cured in a UV-LED chamber (375 nm) for 6 min. No further modification of the reference object's surface was performed. A visual inspection of the printed and post-cured reference object revealed strong striping artefacts in the form of dense parallel lines on the surface and within the bulk of the cured material visible with the naked eye.

The object (manufactured in accordance with an exemplary embodiment) also was a rectangular cuboid (dimensions x,y,z: 7×14×1 mm). After printing, the object was removed from the container and washed in a bath containing tripropyleneglycol monomethyl ether (TPM) for 5 min. The object was removed from the bath and remaining TPM was washed away with ethanol before the object was dried in air for 10 min. Finally, the object was post-cured in a UV-LED chamber (375 nm) for 6 min. No further modification of the object's surface was performed. Visual inspection of the printed and post-cured object shows a smooth surface and optically clear and homogeneous bulk properties without any defects or striping artefacts visible to the naked eye.

The reference object and the object were analyzed using a Keyence VK-X3000 confocal laser scanning microscope. Surface roughness was determined as an average of 11 profile lines along the object's surface with a cutoff wavelength at $\lambda_c$=0.25 mm according to ISO 4287. The obtained values and standard deviations are as follows:

| | Ra [μm] | Rz [μm] |
|---|---|---|
| Reference object (without light modulation device) | 1.037 ± 0.009 | 6.332 ± 0.108 |
| Object (with light modulation device) | 0.088 ± 0.010 | 0.457 ± 0.020 |

The experiments show that due to the implementation of the light modulation device 11 as specified above, the properties, i.e. the surface roughness of the as printed and post-cured object was reduced by more than a factor of 10 as compared to the reference object.

Figure 16:
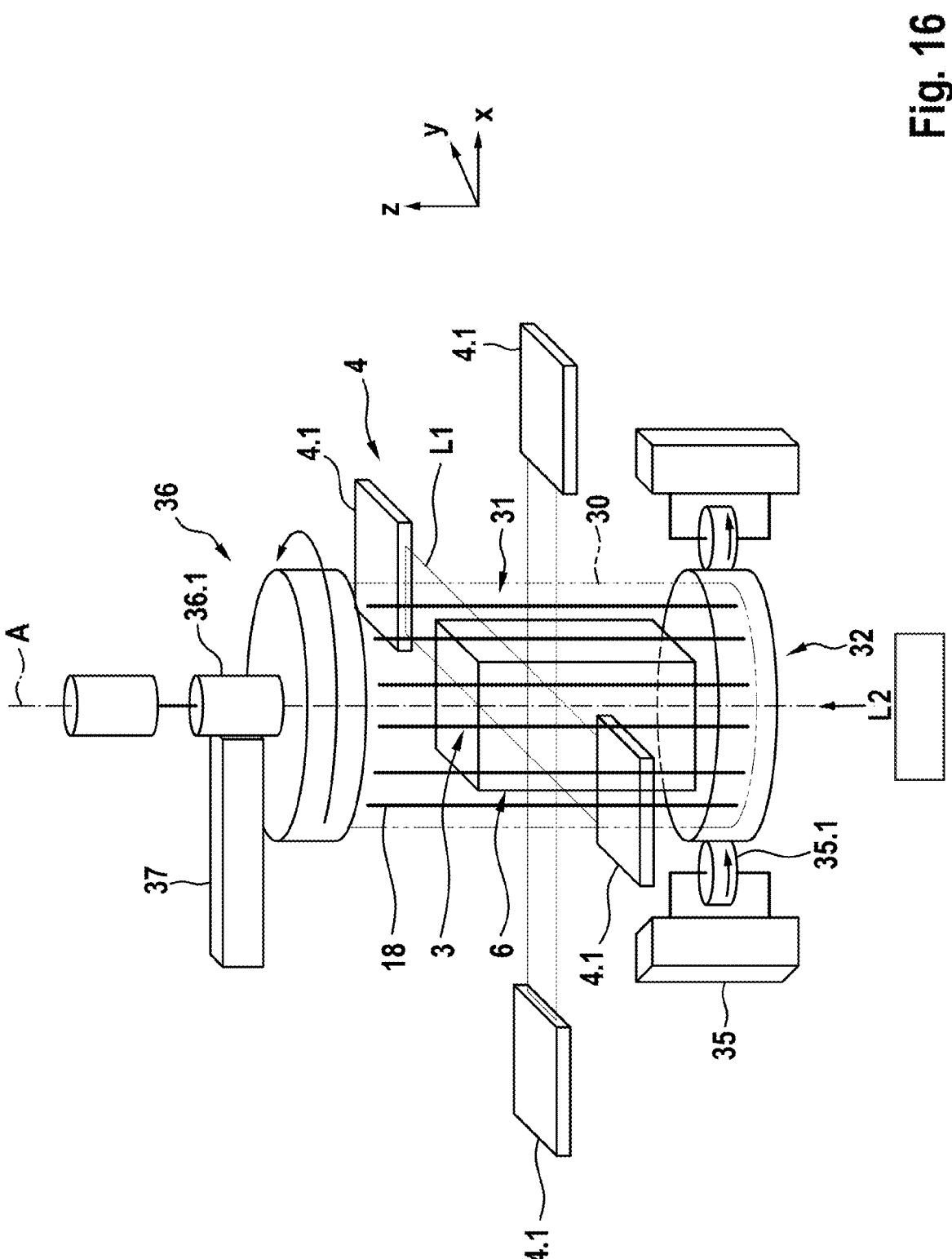
FIG. 16-18 each show a principle drawing of an apparatus for volumetric 3d-printing for forming at least one three-dimensional object according to another exemplary embodiment.

FIG. 16 shows a principle drawing of an apparatus 1 for volumetric 3d-printing for forming at least one three-dimensional object according to another exemplary embodiment.

The exemplary embodiment of FIG. 16 first indicates an exemplary embodiment of a first irradiation device 4 comprising four light sources 4.1 each configured to generate a light sheet of the light L1 of the first wavelength and irradiate the same into the working volume 3. The plurality of individual light sheets extend through the working volume 3 at one or more different angles relative to each other and overlap in at least one light sheet overlapping zone within the working volume 3. The plurality of individual light sheets can form a resulting light sheet within the working volume 3.

Additionally or alternatively, each individual light sheet comprises a main extension direction through the working volume. Hence, the at least one first irradiation device 4 can be configured to generate a plurality of individual light sheets, wherein the main extension directions of the respective individual light sheets extend through the working volume at one or more different angles relative to each other. The main extension directions of the individual light sheets typically, intersect in the at least one light sheet overlapping zone.

Particularly, the first irradiation device 4 can be configured to generate four individual light sheets, wherein at least a first individual light sheet extends at a first angle through the photocurable resin, a second individual light sheet extends at an angle of ca. 90° relative to the first individual light sheet through the photocurable resin, a third individual light sheet extends at an angle of ca. 90° relative to the second individual light sheet through the photocurable resin, and a fourth individual light sheet extends at an angle of ca. 90° relative to the third individual light sheet through the photocurable resin which results in a cross-like arrangement of the individual light sheets.

The exemplary embodiment of FIG. 16 further indicates a carrier structure 30 which carries optical elements, such as e.g. lens elements 18, particularly microlens elements, or arrays of lens elements 18 or microlens elements, respectively, of the light modulation device 9. The carrier structure 30 is arranged to surround the working volume 3 and a respective container 6 delimiting the working volume 3, respectively. The carrier structure 30 can thus, define an accommodation space 31, e.g. a cylindrical or polygonal accommodation space, for accommodating the working volume 3 and a respective container 6, respectively. The carrier structure 30 can thus, have a hollow-cylindrical or polygonal base shape, for instance. The carrier structure 30 can have an open portion 32 (opening), such as e.g. an open lower portion, which enables insertion and removal of a respective container 6. The provision of a carrier structure 30 be particularly, beneficial in connection with embodiments in which the at least one first irradiation device 4 is configured to generate a plurality of individual light sheets, particularly four individual light sheets, which extend through the working volume 3 at at least one or more different angles relative to each other since it enables generating a resulting light sheet of desired properties.

The carrier structure 30 can be at least partially transparent with respect to the light of the first and/or second wavelength. Particularly, the carrier structure 30 can be transparent with respect to the light L1, L2 of the first and/or second wavelength at portions through which the light L1, L2 of the first and/or second wavelength enters the working volume 3 surrounded by the carrier structure 30. As such, the carrier structure 30 can be at least partly made of glass or a transparent polymer material, such as e.g. PC (polycarbonate), PMMA (polymethylmethacrylate), or COC (cyclic olefin copolymer), for instance.

The carrier structure 30 can comprise one or more non-reflective surfaces to avoid undesired optical effects based on reflection of the light of at least the first wavelength. Respective non-reflective surfaces can be provided at upper and/or lateral portions of the carrier structure 30. Respective non-reflective surfaces can be provided by non-reflective materials, for instance. As an example, the carrier structure 30 can comprise a flexible element, such as e.g. a foil, particularly having one or more non-reflective surfaces. A concrete example is a lenticular foil or lenticular sheet, respectively.

The carrier structure 30 can be rotatably supported about a rotation axis A, particularly a rotation axis which extends parallel to a central axis of the working volume 3 and/or orthogonal to the respective light sheets, respectively. At least one support device 35 can be assigned to the carrier structure 30 to support the carrier structure 30 and maintain its orientation and/or position with respect to the rotation axis A and working volume 3, respectively. The at least one support device 35 can comprise one or more support elements 35.1, such as e.g. bearings, etc. which are directly or indirectly coupled with the carrier structure. Particularly, at least three support elements 35.1 can be provided, which are preferably circumferentially equally arranged around the carrier structure 30. Further, at least one drive device 36, such as e.g. a motor, can be assigned to the carrier structure 30 to generate a force or momentum which sets the carrier structure 30 in a rotational motion about the rotation axis A. The at least one drive device 36 can comprise one or more drive elements 36.1, such as e.g. gears, couplable or coupled with the carrier structure 30 to transfer a respective force or momentum on the carrier structure 30. The at least one drive device 36 can also form a part of the support device 35 or vice versa. Hence, embodiments in which a drive device 36 transfers a force or momentum on the carrier structure 30 via one or more gears and/or one or more bearings, are conceivable.

The carrier structure 30 and/or the working volume and/or a respective container 6 delimiting the working volume, respectively can be moveably supported relative to each other. As an example, the carrier structure 30 can be moveably supported in at least one operating position as indicated in FIG. 16 in which it is positioned relative to the working volume 3 and a respective container 6, respectively such that it surrounds the working volume 3 and the container 6, respectively, and in at least one non-operating position in which it is positioned relative to the working volume 3 and the container 6, respectively such that it does not surround the working volume 3 and the container 6, respectively. As such, a transfer structure 37 can be assigned to the carrier structure 30 which is configured to transfer the carrier structure 30 in the at least one operating and non-operating position, respectively.

Figures 17, 18:
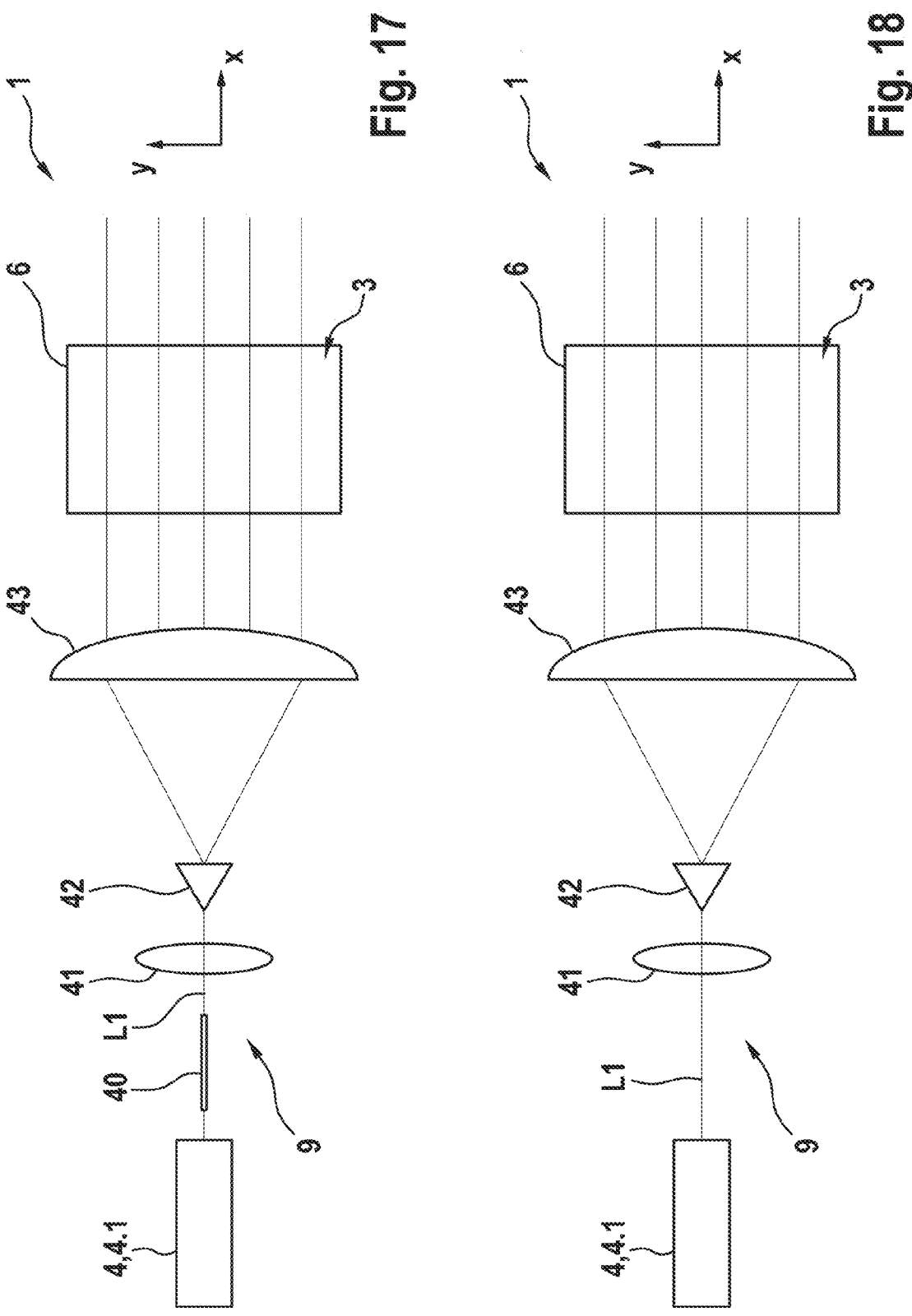

FIGS. 17 and 18 each shows a principle drawing of an apparatus 1 for volumetric 3d-printing for forming at least one three-dimensional object according to another exemplary embodiment.

FIGS. 17 and 18 generally show that a light modulation device 9 can be configured to generate one or more points within the working volume 3 or at least one formation zone, respectively through which light beams of the first wavelength extend based on at least one of the following principles for speckle reduction: angular diversity (as implemented by the embodiments of FIG. 1-16), polarization diversity, and wavelength diversity. The light modulation device 9 can thus, be configured to generate at least two light beams of the first wavelength which have different polarizations or polarization states in at least one point within the working volume 3 (polarization diversity) as shown in FIG. 17, and/or to generate at least two light beams which have different wavelengths (wavelength diversity), particularly within a specific wavelength range, in at least one point within the working volume 3, as shown in FIG. 18.

FIG. 17 specifically shows that principles of polarization diversity can comprise generating or using at least two light beams of the first wavelength which have different polarizations or polarization states, particularly two orthogonal polarization states, in at least one point within the working volume 3 or formation zone, respectively. Particularly, at least one of the at least two light beams can be incoherent, e.g. generated by an optical fiber 40 or at least two different light sources. Respective different polarizations or polarization states can comprise different linear polarizations or different circular polarizations, for instance. In such embodiments, the light modulation device 9 can comprise at least one optical fiber 40, at least one polarization element 41, such as e.g. a polarization filter, particularly a polarization filter which is rotatable about a rotation axis which can be or comprise the axis of a light beam as emitted by a light source 4.1 of the first wavelength, and a beam expansion device 42 configured to expand an incident light beam, e.g. to generate a light sheet or line-shaped beam cross-section or beam profile, respectively, and at least one collimating element 43, such as e.g. a collimating lens, for instance.

FIG. 18 specifically shows that principles of wavelength diversity can comprise generating or using at least two light beams of the first wavelength which have different wavelengths in at least one point within the working volume 3 or formation zone, respectively. Particularly, respective different wavelengths can be generated by a broadband light source in combination with an optical filter 44, e.g. a bandpass filter at varying angles of incidence. Respective different wavelengths can be wavelengths within a range of 350 nm-500 nm, particularly 375 nm-450 nm, more particularly 385 nm-440 nm, more particularly 395 nm-420 nm, more particularly 400 nm-410 nm, for instance. In such embodiments, the light modulation device 9 can comprise at least one optical filter element 44, such as e.g. a bandpass filter, particularly a bandpass filter which is moveable in at least one degree of freedom of motion, e.g. rotatable or tiltable about a rotational or tilt axis which can be or comprise the axis of a light beam as emitted by a light source 4.1 of the first wavelength, a beam expansion device 42 configured to expand an incident light beam, e.g. to generate a light sheet or line-shaped beam cross-section or beam profile, respectively, and at least one collimating element 43, such as e.g. a collimating lens, for instance.

One, more, or all features of a specific exemplary embodiment of the apparatus 1 can be combined with one, more, or all features of at least one further exemplary embodiment of the apparatus 1.

The invention claimed is:

1. An apparatus for volumetric 3d-printing to form a three-dimensional object via dual-color photopolymerization, the apparatus comprising:
   a working volume configured to receive a photopolymerizable material which is to be irradiated with light for forming a three-dimensional object;
   at least one first irradiation device configured to generate at least one first light projection of light of a first wavelength in the working volume, the at least one first light projection comprising multiple light beams traversing the working volume in at least one light plane, wherein the at least one first light projection is a light sheet;
   at least one second irradiation device configured to generate a second light projection of light of a second wavelength in the working volume, the second light projection intersecting the first light projection at a specific angle;
   at least one light modulation device assigned to the at least one first irradiation device, the at least one light modulation device configured to modulate a spatial extension direction of two or more light beams of the multiple light beams in the at least one light plane such that the two or more light beams extend in a non-parallel arrangement relative to each other and intersect at at least one intersection point within the at least one light plane.

2. The apparatus according to claim 1, wherein the at least one light modulation device is configured to modulate the spatial extension direction of the two or more light beams in a common light plane such that the two or more light beams intersect at one or more points in the common light plane.

3. The apparatus according to claim 1, wherein the at least one light modulation device comprises one or more optically transmissive elements and/or one or more optically reflective elements and/or one or more optically diffractive elements.

4. The apparatus according to claim 1, wherein the at least one first irradiation device comprises at least one first light source configured to generate the light of the first wavelength, wherein the at least one light modulation device is arranged in the optical path between the at least one first light source of the at least one first irradiation device and the working volume, wherein the at least one first irradiation device comprises at least one first light source configured to generate the light of the first wavelength, wherein the at least one light modulation device is arranged in the optical path between the at least one first light source of the at least one first irradiation device and the working volume.

5. The apparatus according to claim 1, wherein the at least one light modulation device or at least one component thereof is moveably supported in at least one degree of freedom of motion relative to at least one light source of the at least one first irradiation device or relative to the working volume; and/or
   wherein the at least one first irradiation device or at least one component thereof is moveably supported in at least one degree of freedom of motion relative to the working volume.

6. The apparatus according to claim 1, comprising a collimator device configured to collimate the light emitted from at least one first light source of the at least one first irradiation device before it enters the working volume, wherein the at least one light modulation device comprises at least one optical lens arranged upstream of the collimator device.

7. The apparatus according to claim 1, comprising at least one light deflection device configured to deflect light emitted from at least one first light source of the at least one first irradiation device towards the working volume, wherein the at least one light modulation device comprises at least one optical lens arranged upstream of the light deflection device.

8. The apparatus according to claim 1, comprising at least one light deflection device configured to deflect light emitted from at least one first light source of the at least one first irradiation device towards the working volume, wherein the at least one light modulation device comprises at least one beam steering device arranged upstream of the at least one light deflection device, the at least one beam steering device configured to change the spatial extension direction of a light beam emitted from the at least one first light source towards the at least one beam steering device.

9. The apparatus according to claim 8, wherein the at least one beam steering device comprises at least one of: an optically transmissive element moveably supported in at least one degree of freedom of motion, wherein the at least one beam steering device is configured to change the direction of the spatial extension of a light beam emitted from the at least one first light source towards the at least one beam steering device via one or more motions of at least one transmissive element in the at least one degree of freedom of motion and at least one optically reflective element moveably supported in at least one degree of freedom of motion, wherein the at least one beam steering device is configured to change the spatial extension direction of a light beam emitted from the at least one first light source towards the at least one beam steering device via one or more motions of the at least one transmissive element in the at least one degree of freedom of motion.

10. The apparatus according to claim 1, wherein the at least one light modulation device comprises at least one adaptive optical element having an adaptive shape, wherein the at least one adaptive optical element is configured to change the spatial extension direction of the spatial extension of a light beam via one or more changes of its shape.

11. The apparatus according to claim 1, wherein the at least one light modulation device comprises a collimator device which is moveably supported in at least one degree of freedom of motion.

12. The apparatus according to claim 1, comprising at least one light deflection device configured to deflect light emitted from the or at least one first light source of the at least one first irradiation device towards the working volume, wherein the at least one light deflection device comprises a base body, wherein the at least one light modulation device comprises at least one optical element attached to the outer surface of the base body.

13. The apparatus according to claim 1, comprising at least one light deflection device configured to deflect light emitted from the or at least one first light source of the at least one first irradiation device towards the working volume, wherein the at least one light deflection device comprises a base body, wherein the at least one light modulation device comprises a surface structuring of the outer surface of the base body.

14. The apparatus according to claim 1, wherein the working volume is provided by at least one container device, the container device delimiting a container volume for receiving the photopolymerizable material.

15. The apparatus according to claim 1, further comprising a determination device configured to determine the surface and/or bulk properties of a three-dimensional object being manufactured with the apparatus, wherein the determination device comprises a detection unit configured to detect information indicative of the surface and/or bulk properties of a three-dimensional object being manufactured with the apparatus; wherein the information indicative of the surface and/or bulk properties of a three-dimensional object being manufactured with the apparatus can be communicated to a control unit of the apparatus, wherein the control unit is configured to control operation of the at least one light modulation device based on the information.

16. The apparatus according to claim 1, wherein the at least one light modulation device is configured to generate one or more points within the at least one formation zone through which the two or more light beams of the multiple light beams of the first wavelength extend based on at least one of the following principles for speckle reduction: angular diversity, polarization diversity, and wavelength diversity.

17. The apparatus according to claim 1, wherein the specific angle is 45° or 90°.

18. An apparatus for volumetric 3d-printing to form a three-dimensional object via dual-color photopolymerization, the apparatus comprising:

a working volume configured to receive a photopolymerizable material which is to be irradiated with light for forming a three-dimensional object;

at least one first irradiation device configured to generate at least one first light projection of light of a first wavelength in the working volume, the at least one first light projection comprising multiple light beams traversing the working volume in at least one light plane;

at least one second irradiation device configured to generate a second light projection of light of a second wavelength in the working volume, the second light projection intersecting the first light projection at a specific angle;

at least one light modulation device assigned to the at least one first irradiation device, the at least one light modulation device configured to modulate a spatial extension direction of two or more light beams of the multiple light beams in the at least one light plane such that the two or more light beams extend in a non-parallel arrangement relative to each other, and/or to generate at least two light beams of the first wavelength which have different polarizations or polarization states in at least one point within the working volume, and/or to generate at least two light beams which have different wavelengths in at least one point within the working volume, wherein the at least one light modulation device comprises one or more optical elements, wherein each optical element is configured to change the original spatial extension direction of at least one incident light beam to generate a light beam having a different spatial extension direction relative to the original spatial extension direction such that the at least one light modulation device is configured to generate at least two light beams intersecting at at least one intersection point within the at least one light plane.

19. The apparatus according to claim 18, wherein the optical elements are built as or comprise at least one of: optical lenses, microlenses, optical diffuser elements, and elliptical diffuser elements, wherein the one or more optical elements are arranged or built on at least one side of a substrate element arranged in the optical path upstream of the working volume.

20. A method for volumetric 3d-printing to form a three-dimensional object via dual-color photopolymerization, the method comprising:

generating, via at least one first irradiation device, a first light projection of light of a first wavelength in the working volume, the first light projection comprising multiple light beams traversing the working volume in a common plane, wherein the first light projection is a light sheet;

generating, via at least one second irradiation device, a second light projection of light of a second wavelength in the working volume, the second light projection intersecting the first light projection at a specific angle; and modulating, via at least one light modulation device assigned to the at least one first irradiation device, a spatial extension direction of two or more light beams of the multiple light beams in a common plane such that the two or more light beams extend in a non-parallel arrangement relative to each other and intersect at at least one intersection point within the common plane.

21. An apparatus for volumetric 3d-printing to form a three-dimensional object via dual-color photopolymerization, the apparatus comprising:

a working volume configured to receive a photopolymerizable material which is to be irradiated with light for forming a three-dimensional object;

at least one first irradiation device configured to generate at least one first light projection of light of a first wavelength in the working volume, the at least one first light projection comprising multiple light beams traversing the working volume in at least one light plane, wherein the at least one first light projection is a light sheet;

at least one second irradiation device configured to generate a second light projection of light of a second wavelength in the working volume, the second light projection intersecting the first light projection at a specific angle;

at least one light modulation device assigned to the at least one first irradiation device, the at least one light modulation device configured to generate at least two light beams of the first wavelength which have different polarizations or polarization states in at least one point within the working volume.

* * * * *